(12) United States Patent
Kapicki

(10) Patent No.: US 12,428,245 B2
(45) Date of Patent: Sep. 30, 2025

(54) DEVICE AND CONVEYANCE SYSTEM FOR PACKAGING ELONGATED ITEMS

(71) Applicant: AND Y KNOT INNOVATION AND SALES INC., Leduc (CA)

(72) Inventor: Melvin Douglas Kapicki, Leduc (CA)

(73) Assignee: AND Y KNOT INNOVATION AND SALES INC., Leduc (CA)

( * ) Notice: Subject to any disclaimer, the term of this patent is extended or adjusted under 35 U.S.C. 154(b) by 0 days.

(21) Appl. No.: 18/434,300

(22) Filed: Feb. 6, 2024

(65) Prior Publication Data

US 2024/0174462 A1 May 30, 2024

Related U.S. Application Data

(63) Continuation of application No. PCT/CA2022/051215, filed on Aug. 9, 2022.
(Continued)

(51) Int. Cl.
*B65G 57/03* (2006.01)
*B65B 25/02* (2006.01)
(Continued)

(52) U.S. Cl.
CPC ............ *B65G 57/035* (2013.01); *B65B 25/02* (2013.01); *B65B 35/44* (2013.01); *B65B 35/50* (2013.01);
(Continued)

(58) Field of Classification Search
CPC ......... B65B 35/50; B65B 27/10; B65B 19/34; B65B 25/02; B65B 35/44; B07C 5/14;
(Continued)

(56) References Cited

U.S. PATENT DOCUMENTS 1,757,634 A     5/1930   Jacques
3,407,932 A  *  10/1968  Northoff ................. B07C 5/22
                                                          209/516
(Continued)

FOREIGN PATENT DOCUMENTS

CA      3088030       4/2020
CN    105599993       5/2016
(Continued)

OTHER PUBLICATIONS

USPTO Non-Final Office Action dated Nov. 17, 2023 for U.S. Appl. No. 17/931,971, 20 pages.
(Continued)

*Primary Examiner* — Gregory W Adams
(74) *Attorney, Agent, or Firm* — Heslin Rothenberg Farley & Mesiti P.C.

(57) ABSTRACT

A device and conveyance system are provided for packaging elongated items such as firewood pieces. The device includes: an elevated structure having an upper platform for receiving the elongated items from a separate conveyor; a paddlewheel diverter located on or above the platform for changing the direction of movement of the elongated items; and one or more elevator shafts having open bottoms. The elevator shafts are located adjacent to the platform and configured for receiving the elongated items after contact with the diverter and for holding the elongated items on support structures while a stack of elongated items is formed. The release of the stack of elongated items from the elevator shafts occurs via the open bottoms of the elevator shafts. The system includes one or more conveyors having features inducing alignment of the elongated items prior to conveyance to the device.

22 Claims, 22 Drawing Sheets

Related U.S. Application Data

(60) Provisional application No. 63/231,787, filed on Aug. 11, 2021.

(51) Int. Cl.
  *B65B 35/44* (2006.01)
  *B65B 35/50* (2006.01)
  *B65G 47/14* (2006.01)
  *B65G 47/57* (2006.01)

(52) U.S. Cl.
  CPC ......... *B65G 47/1492* (2013.01); *B65G 47/57* (2013.01); *B65G 2201/0217* (2013.01)

(58) Field of Classification Search
  CPC .. B65G 57/035; B65G 47/1492; B65G 47/57; B65G 2201/0217; B65G 47/846; B65G 47/82
  USPC ........ 198/367, 367.1, 367.2, 370.07, 370.08, 198/598, 722; 209/918
  See application file for complete search history.

(56) References Cited

U.S. PATENT DOCUMENTS

| | | | |
|---|---|---|---|
| 3,641,735 A | | 2/1972 | Daily et al. |
| 3,815,763 A | | 6/1974 | Biloco et al. |
| 3,905,466 A | * | 9/1975 | VanDeberg ............ B65G 47/57 |
| | | | 198/449 |
| 4,057,138 A | | 11/1977 | Grebe |
| 4,219,057 A | | 8/1980 | Falk |
| 4,432,186 A | | 2/1984 | McGregor |
| 4,457,153 A | * | 7/1984 | Russell .................... B21H 3/08 |
| | | | 414/745.9 |
| 4,492,070 A | | 1/1985 | Morse et al. |
| 4,871,059 A | | 10/1989 | Rantanen et al. |
| 4,936,362 A | | 6/1990 | Heikkinen |
| 5,052,542 A | | 10/1991 | Wipf |
| 5,074,104 A | | 12/1991 | Desjonqueres et al. |
| 5,117,614 A | | 6/1992 | Johnsen |
| 5,127,212 A | | 7/1992 | Johnsen et al. |
| 5,255,584 A | | 10/1993 | Fakler |
| 5,655,643 A | | 8/1997 | Bonnet |
| 5,761,883 A | | 6/1998 | Pruett et al. |
| 6,264,422 B1 | | 7/2001 | Hennes et al. |
| 6,564,528 B1 | | 5/2003 | Keegan |
| 6,779,321 B1 | | 8/2004 | Keleman |
| 6,860,379 B2 | * | 3/2005 | Matsuda ............ B65G 47/1471 |
| | | | 198/395 |
| 6,884,016 B2 | * | 4/2005 | Ogle ........................ B65B 5/08 |
| | | | 198/546 |
| 6,974,020 B1 | | 12/2005 | Peppel |
| 7,798,312 B2 | | 9/2010 | Brumm |
| 7,931,152 B2 | | 4/2011 | Lahteenmaki et al. |
| 7,992,700 B2 | | 8/2011 | Thoonsen et al. |
| 8,616,363 B1 | | 12/2013 | Carter |
| 10,035,611 B2 | | 7/2018 | Holtet et al. |
| 10,150,627 B2 | | 12/2018 | Zimmer et al. |
| 10,336,547 B2 | * | 7/2019 | Meier .................... B65G 15/12 |
| 11,465,792 B2 | * | 10/2022 | Kapicki .................. B65B 5/067 |
| 12,006,079 B2 | * | 6/2024 | Kapicki .................. B65B 57/00 |
| 2002/0003999 A1 | | 1/2002 | Bonde et al. |
| 2013/0199132 A1 | | 8/2013 | Fakler |
| 2014/0033740 A1 | | 2/2014 | Pape |
| 2015/0068156 A1 | | 3/2015 | Zhou et al. |
| 2015/0210409 A1 | | 7/2015 | Berger |
| 2016/0228921 A1 | | 8/2016 | Doublet et al. |
| 2018/0009610 A1 | | 1/2018 | Alexanderson |
| 2018/0162571 A1 | | 6/2018 | Nijland et al. |
| 2018/0333749 A1 | | 11/2018 | Wagner et al. |
| 2021/0362896 A1 | * | 11/2021 | Kapicki .................. B65B 19/34 |
| 2023/0011190 A1 | | 1/2023 | Kapicki |

FOREIGN PATENT DOCUMENTS

| | | |
|---|---|---|
| CN | 110325295 | 10/2019 |
| DE | 3511993 | 10/1985 |
| DE | 202009014960 | 4/2010 |
| EP | 652085 | 10/1985 |
| EP | 0547485 | 6/1993 |
| EP | 2796377 | 10/2014 |
| EP | 2842876 | 3/2015 |
| EP | 3180170 | 6/2018 |
| GB | 620743 | 3/1949 |
| WO | 2015097299 | 7/2015 |
| WO | 2016037200 | 3/2016 |
| WO | 2018154325 | 8/2018 |
| WO | 2020082177 | 4/2020 |
| WO | 2023015385 | 2/2023 |

OTHER PUBLICATIONS

Examiners Requisition for Canadian Application No. 3,088,030 dated Dec. 23, 2021, 2 pages.

Examiners Requisition for Canadian Application No. 3,088,030 dated May 4, 2022, 4 pages.

International Search Report and Written Opinion of the International Searching Authority for International Application No. PCT/CA2019/051502 mailed on Dec. 31, 2019, 10 pages.

Extended European Search Report for EP 19875408.7, dated Jul. 12, 2022, 8 pages.

International Search Report and Written Opinion of the International Searching Authority for International Application No. PCT/CA2022/051502 mailed on Nov. 10, 2022, 12 pages.

European Patent Office, Partial Supplementary European Search Report for European Application No. 22854828.5 dated Apr. 3, 2025, 14 pages.

\* cited by examiner

DEVICE AND CONVEYANCE SYSTEM FOR PACKAGING ELONGATED ITEMS

CROSS REFERENCE TO RELATED APPLICATIONS

This continuation application claims priority benefit from International Application No. PCT/CA2022/051215 filed on Aug. 9, 2022, which claimed priority from U.S. Provisional Application No. 63/231,787 filed Aug. 11, 2021, which are both incorporated herein by reference in their entirety.

FIELD OF THE INVENTION

The invention relates generally to stacking and packing elongated items and provides a device and conveyance system for assembling packages of stacked elongated items which are convenient for transport and sale.

BACKGROUND OF THE INVENTION

Stacking and packaging of elongated items represents a challenging task in a number of applications. For example, the sale of packages of firewood in sizes convenient for use in fireplaces and campgrounds has become relatively commonplace at supermarkets, hardware stores and convenience stores. The widespread consumption of firewood provided in such packages has motivated businesses engaged in producing such firewood packages to pursue improvements relating to economy of scale, which involve development of new devices and systems.

Since trees and logs cut therefrom are well known to contain irregularities in shape and consistency such as irregular curvature and large knots, for example, firewood pieces tend to vary considerably with respect to size and shape. Such irregularities, together with the relatively heavy weight of individual firewood pieces, present challenges to individuals in terms of physical labor and efficiency when individually filling bags or boxes with firewood pieces.

Firewood packaging machines have been developed in attempts to address these problems. Examples of wood processing machines, some of which include features relating to packaging of firewood are described, for example, in U.S. Pat. Nos. 10,035,611, 8,616,363, 7,931,152, 7,798,312, 4,936,362, 4,219,057, and 3,815,763, US Patent Publication No. US20180009610, PCT Publication No. WO2016037200, European Patent Application Nos. EP2796377 and EP2842876, and UK Patent Application No. GB620743, each of which is incorporated herein by reference in its entirety.

There continues to be a need for improvements in devices used for stacking and packaging of elongated items such as firewood, lumber pieces, pipes, cylinders, rods and agricultural products including vegetables such as corn cobs to satisfy a growing need for packaging of such items in the marketplace.

SUMMARY OF THE INVENTION

In accordance with one embodiment, there is provided a device for packaging elongated items. The device includes an elevated structure having an upper platform for receiving the elongated items from a separate conveyor; a diverter located on or above the platform, for changing the direction of movement of the elongated items; and one or more elevator shafts having open bottoms. The elevator shafts are located adjacent to the platform and configured for receiving the elongated items after contact with the diverter and configured for holding the elongated items therein while a stack of elongated items is formed. The elevator shafts are provided with one or more support structures configured to hold the stack of elongated items as it is formed and to release the stack of elongated items from the device after it is completely formed, with the release of the stack of elongated items from the elevator shafts occurring via the open bottoms of the elevator shafts.

The one or more elevator shafts may be two opposed elevator shafts arranged laterally outward from outer edges of the platform. The platform, the diverter and the elevator shafts may be protected by an upper cover.

The diverter may be a paddlewheel mounted above the platform. The paddlewheel may be mounted with a diverter driveshaft passing through opposed vertical walls of the cover.

The paddlewheel may be configured for both clockwise and counterclockwise rotation by rotation of the diverter driveshaft.

The paddlewheel may have two paddles or three paddles.

An entrance may be formed in the upper cover. The entrance may be configured to allow the elongated items to pass from the conveyor to the platform.

In some embodiments, the device further comprises two or more elevator mechanisms located below the platform. The two or more elevator mechanisms may be configured to provide cyclic movement of the support structures, the cyclic movement including downward movement of the support structures within the elevator shafts and upward movement of the support structures outside of the elevator shafts.

The two or more elevator mechanisms may be provided as two or more chain drives. Each chain drive of the two or more chain drives may include a pair of parallel chain and sprocket sets configured to provide the cyclic movement from one set of chain driveshafts.

Each of the support structures may be formed by a pair of support members connected adjacent to each other on separate chains of the pair of parallel chain and sprocket sets.

The device may include two pairs of support structures connected to the pair of parallel chain and sprocket sets at opposing positions along the chains of the pair of parallel chain and sprocket sets.

Each chain drive of the two or more chain drives may be driven by a separate motor under control by a central controller.

The motor may be configured to provide at least two different rates of rotation of its corresponding chain drive, wherein a faster rate of rotation is provided at the release of the stack of elongated items from one of the elevator shafts.

Each of the one or more elevator shafts may have a lateral window for allowing a worker to gain access to the interior of each of the two or more elevator shafts.

The cover may include a pair of upper windows for allowing a worker to gain access to a space within the interior of the cover above the two or more elevator shafts.

Each upper window of the pair of upper windows may hold a corresponding deflection adjuster with one or more downward pointing members provided to deflect wood pieces downward into a corresponding elevator shaft of the two or more elevator shafts, the deflection adjuster moveable within the upper window.

Each of the one or more elevator shafts may include one or more retention structures for holding a package in place to receive the elongated items after release of the elongated items from the support structure.

The retention structures may include at least one opposed lateral flat package guide and a package gripper configured to grip the package between an outer surface of the flat package guide and a jaw of the package gripper.

The package gripper may include an actuator configured for remote operator actuation to move the package gripper from a normally closed gripping arrangement to an open arrangement.

The device may further include at least one sensor in each elevator shaft to detect a point in time when the stack of elongated items is completely formed, the sensor providing a signal to the diverter to change the direction of movement of the elongated items.

The device may further include a paddlewheel sensor for detecting the presence of an elongated item on the platform below the paddlewheel, wherein the paddlewheel is configured to remain stationary when the paddlewheel sensor does not detect the elongated item on the platform and to rotate to cause the elongated item to be moved into an elevator shaft of the one or more elevator shafts when the paddlewheel sensor detects the elongated item on the platform below the paddlewheel.

The paddlewheel may be configured to rotate by about 120 degrees with each successive instance of detecting the presence of an elongated item on the platform if the paddlewheel has three paddles, or configured to rotate by about 180 degrees with each successive instance of detecting the presence of an elongated item on the platform if the paddlewheel has two paddles.

The elongated items may be firewood, lumber pieces, pipes, cylinders, rods or vegetables.

In accordance with another embodiment, there is provided a method for packaging elongated items. The method includes the steps of a) providing an elevated platform for receiving the elongated items and two or more elevator shafts adjacent to the platform; b) diverting the elongated items into one of the two or more elevator shafts and onto a corresponding support structure until a first stack of the elongated items is formed; c) dropping the first stack from the support structure into a first package; d) diverting the elongated items into another one of the two or more elevator shafts and onto another corresponding support structure until a second stack of the elongated items is formed; and e) dropping the second stack into a second package.

The step of receiving the elongated items may include receiving the elongated items from a conveyor.

The step of diverting the elongated items may include diverting the elongated items using a diverter structure mounted on or above the platform.

The support structure may be mounted on a chain of a chain drive configured to cycle the support structure downward within a corresponding elevator shaft of the two or more elevator shafts.

The two or more elevator shafts may be two elevator shafts and after step e), the method may further include cycling between step b) and step e), thereby generating and dropping additional stacks into additional packages.

In some embodiments of the method, if an obstruction prevents the first stack or the second stack from being properly formed in either step b) or step d), the method further includes halting either step b) or step d) and skipping to the other of step b) or step d), removing the obstruction and re-initiating the cycling between step b) and step e).

The obstruction may be detected by a sensor and an audible or visible signal is provided to prompt a worker to perform the steps a) to e).

In accordance with another embodiment, there is provided a use of the device as described herein for packaging elongated items ranging in length from between about 2 inches (about 5.1 cm) to about 18 inches (about 45.7 cm). The support members may each support a container for collecting the smaller elongated items. The elongated items may be firewood, lumber pieces, pipes, cylinders, rods or agricultural products.

In accordance with another embodiment, there is provided a method for packaging elongated items. The method includes the steps of a) providing an elevated platform for receiving the elongated items and one or more elevator shafts adjacent to the platform; b) diverting the elongated items off an edge of the platform and into one of the two or more elevator shafts and onto a corresponding support structure until a first stack of the elongated items is formed; and c) dropping the first stack from the support structure into a first package;

The step of receiving the elongated items may further include receiving the elongated items from a conveyor.

The step of diverting the elongated items may include diverting the elongated items using a diverter structure mounted on or above the platform.

The support structure may be mounted on a chain of a drive mechanism configured to cycle the support structure downward within a corresponding elevator shaft of the two or more elevator shafts.

The drive mechanism may be a chain drive.

In accordance with another embodiment, there is provided a device for packaging elongated items. The device includes an elevated structure having an upper platform for receiving the elongated items from a separate conveyor, a paddlewheel diverter located above the platform, for changing the direction of movement of the elongated items, and one or more elevator shafts having open bottoms. The elevator shafts are located adjacent to the platform and configured for receiving the elongated items after contact with the diverter and configured for holding the elongated items therein while a stack of elongated items is formed. The elevator shafts are provided with one or more support structures configured to hold the stack of elongated items as it is formed and to release the stack of elongated items from the device after it is completely formed, with the release of the stack of elongated items from the elevator shafts occurring via the open bottoms of the elevator shafts.

The one or more elevator shafts may be two opposed elevator shafts arranged laterally outward from outer edges of the platform.

The platform may include a central radiused portion extending below the main horizontal plane of the platform which is provided for centralizing an elongated item on the platform between adjacent paddles of the paddlewheel diverter.

In some embodiments, the paddlewheel diverter is configured for both clockwise and counterclockwise rotation by rotation of the diverter driveshaft.

In some embodiments, the paddlewheel diverter has eight paddles or sixteen paddles, which may be equi-spaced. The paddlewheel diverter may be substantially centered above the radiused portion. The paddles may extend below a horizontal plane of the platform and follow a profile of the radiused portion during rotation of the diverter. Rotation of the diverter may be controlled by a servomotor.

In some embodiments, the elevator shafts have stationary front, back and lateral walls and an inner wall which is pivotable with respect to the stationary front, back and lateral walls. The inner wall may pivot on a hinge located between a top corner of the front wall and a top corner of the back wall. The front, back and lateral walls may have lower ends with curved profiles. Pivoting movement of the pivotable lateral wall may be driven by a remotely controlled actuator for adjusting the volume of the elevator shaft to place packaging on the lower end of the elevator shaft or to dislodge a jammed stack of elongated items. The actuator may be remotely controllable by an operator.

According to another embodiment, there is provided a conveyor system configured for use with any of the embodiments of the device described herein which include a paddlewheel diverter. The conveyor system includes a first conveyor arranged to deliver the elongated items to the platform of the device; and a pair of opposed guide walls adjacent to the first conveyor, the guide walls angled towards each other and aligned with adjacent paddles of the paddlewheel diverter in an open resting position of the diverter where the adjacent paddles form an inverted "V" shape above the platform.

In some embodiments, the conveyor system further includes a second conveyor arranged to convey the elongated items to the first conveyor.

The system may further include a centrifugal feeder configured to convey the elongated items to the second conveyor.

The system may further include an alignment rotor arranged between the second conveyor and the centrifugal feeder, the alignment rotor configured for rotation to induce alignment of the elongated items with a longitudinal axis of the second conveyor.

The system may further include a stack limiting rotator adjacent to the second conveyor, the stack limiting rotator configured to displace a stacked elongated item out of the conveyor system. The alignment rotator and the stack limiting rotator may be configured for rotation driven by a single driveshaft via a belt connecting the alignment rotator and the stack limiting rotator.

The system may further include a sensor configured to detect when a first elongated item is positioned on the platform and a second elongated item is on the first conveyor within a threshold distance from the platform. In this embodiment, the sensor is in communication with a driver of the first conveyor to stop and reverse the conveyor for a predetermined period of time to further separate the second elongated item from the first elongated item.

The device or the system of any of the embodiments described above may be used, for packaging elongated items, wherein the elongated items are firewood, lumber pieces, pipes, cylinders, rods or vegetables. The elongated items range in length from between about 2 inches (about 5.1 cm) to about 18 inches (about 45.7 cm).

BRIEF DESCRIPTION OF THE DRAWINGS

Various objects, features and advantages of the invention will be apparent from the following description of particular embodiments of the invention, as illustrated in the accompanying drawings. The drawings are not necessarily to scale in all cases. Instead, emphasis is placed upon illustrating the principles of various embodiments of the invention. Similar reference numerals indicate similar components.

DETAILED DESCRIPTION FOR CARRYING OUT THE INVENTION

Rationale and Introduction

Figure 1:
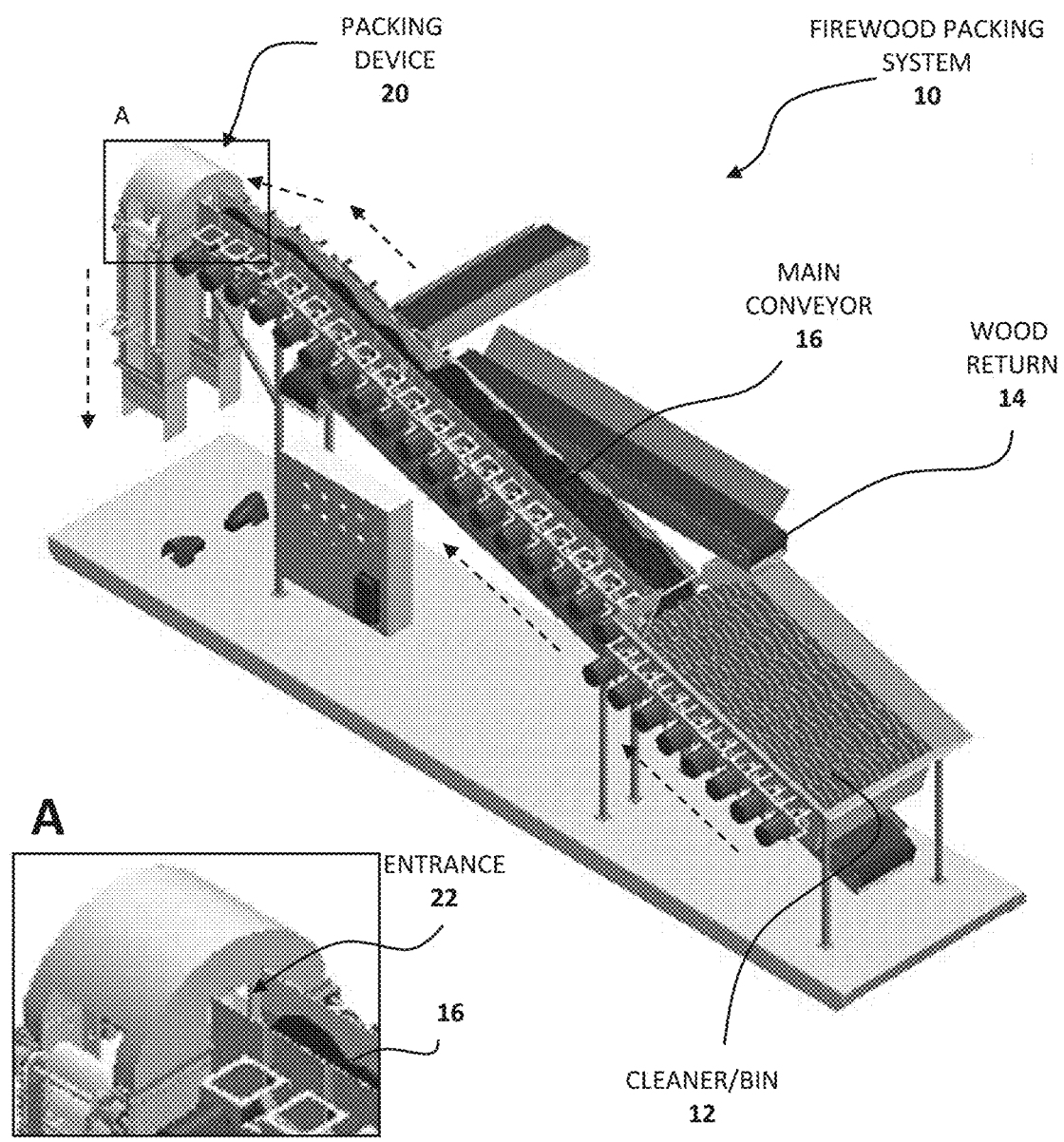
FIG. 1 is a perspective view of one embodiment of a firewood packing system 10 which includes a packing device 20. An expanded view of a top portion of the packing device 10 is shown in the inset, in accordance with an aspect of the present disclosure.

Stacking and packaging of elongated items such as firewood, lumber pieces, pipes, cylinders, rods and agricultural products such as corn cobs presents a number of challenges. With respect to packaging of firewood for example, among the wood processing machines described in patent documents listed in the background section, a machine marketed by Vepak AS of Norway with features described in U.S. Pat. No. 10,035,611, has been recognized in the marketplace as an effective system for packaging firewood. This system operates by conveying individual wood pieces via a conveyor to an upper section with a wood cleaning system comprising irregular shaped rotating discs and then to a packing chamber with an upper hatch. During operation of the system, when a single piece of wood arrives on the closed hatch, the hatch opens and the wood piece drops into the packing chamber. The wood pieces are collected in a stack within the chute until the desired volume of wood pieces is obtained, at which point, the wood pieces are dropped into a bag placed over the bottom opening of the chute.

The inventor of the present application, having significant experience in processing of wood, has recognized that this firewood packaging machine, while effective, has certain shortcomings, particularly in situations where higher throughput processing is desired. For example, the irregular nature of firewood pieces leads to certain challenges in consistent conveyance and alignment which can subsequently lead to jamming at various points in the process. The inventor recognized that a device having more than one firewood stacking chute would enable the device to continue operating while an obstruction is addressed in another stacking chute and that this improvement would greatly improve the output of scaled-up firewood packaging operations. The provision of more than one firewood stacking chute in a single firewood packing device has its own challenges, which are addressed by embodiments of the present invention described herein. It was further recognized by the inventor that the embodiments described herein are also useful for stacking and packaging other elongated items including but not limited to lumber pieces, pipes, cylinders, rods and vegetables such as corn cobs.

Following testing of various prototypes after publication of the inventor's PCT Patent Application WO 2020/082177, the inventor has developed a series of alternative inventive arrangements of components and features which contribute significantly to increased efficiency of operations in the packaging device and in systems used to convey elongated items to the packaging device.

Various aspects of the invention will now be described with reference to the figures. For the purposes of illustration, components depicted in the figures are not necessarily drawn to scale in all cases. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments which are within the scope of the present invention as defined by the claims.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise. The terms "upstream" and "downstream" are used in this description to indicate the direction of process flow.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be understood that, although the terms "first", "second", etc. may be used herein to describe various elements, components, etc., these elements, components, etc. should not be limited by these terms. These terms are only used to distinguish one element, component, etc. from another element, component. Thus, a "first" element, or component discussed below could also be termed a "second" element or component without departing from the teachings of the present invention. In addition, the sequence of operations (or steps) is not limited to the order presented in the claims or figures unless specifically indicated otherwise.

As used herein, the term "firewood" refers to wood material used for fuel. Generally, firewood is not highly processed due to the nature of its intended use and is generally recognizable as part of a log or branch cut from a tree, which may be split from the log or remain round, if cut from a branch. A typical length of an individual piece of firewood is between about 12 to about 18 inches in length (about 30.5 cm to about 46 cm) with an average width of about 3.5 inches to about 4.5 inches (about 9 cm to about 12 cm). A typical individual piece of firewood having these dimensions will have a mass between about 3.0 to about 5.5 pounds (about 1.6 kg to about 2.5 kg). The significant variations in mass arise from the type and condition of the wood and its water content, for example. While the following description describes processing of "wood pieces" it is to be understood that embodiments of the inventive device may also be used to stack and pack any other items having generally similar ranges of dimensions and generally similar masses or may be readily adapted to stack and pack smaller items such as lumber pieces, pipes, cylinders, rods and agricultural products including vegetables as corn cobs, for example.

In some embodiments, when wood pieces between about 12 inches to about 14 inches in length or shorter elongated items are processed, it is advantageous to provide one or more spacers formed of durable material along generally the entire height of the elevator shafts to reduce the effective width of the elevator shafts and induce the wood pieces to stack parallel to each other. Such smaller wood pieces or shorter elongated items might stack in a crooked manner if the extra space within an elevator shaft is not accounted for by inclusion of one or more spacers. In some embodiments, the spacers are constructed of ultra-high molecular weight polyethylene (UHMW) or other similar durable material.

Packaging Device and Conveyor System Embodiments

Turning now to FIG. 1, there is shown one general embodiment of a firewood packing system 10 to provide context of how one example embodiment of the firewood packing device is arranged with respect to other components of the system 10. On the right lower side of FIG. 1, there is a relatively wide and deep cleaner/bin 12 for receiving wood pieces which are already cut to the length desired by the consumer. While having a generally acceptable length at this stage, such wood pieces at this stage include significant amounts of associated wood chips, splinters and other such irregularities which are undesirable and can significantly interfere with firewood packing operations. It is thus advantageous to provide a means for removing these irregularities to provide relatively smooth wood pieces which are convenient to place into packages by devices described herein, with minimal operator involvement. For simplicity, such relatively smooth wood pieces are hereinafter referred to as "cleaned wood pieces."

Wood cleaners of various types are known in the art. Some of the most common and effective wood cleaners include a series of rotating parallel polygonal plates which cause the wood pieces to be agitated to dislodge the splinters, wood chips and other undesirable material while the wood pieces are conveyed. An example of the general function of a wood cleaning apparatus is described with respect to FIG. 2 of U.S. Pat. No. 10,035,611, which is incorporated herein by reference in its entirety.

In the present system example shown in FIG. 1, both the cleaner/bin 12, and the main conveyor 16 are wood cleaning machines. In alternative embodiments, a separate cleaner system may be provided upstream, from which the cleaned wood pieces are conveyed or dumped either into a separate bin, or directly onto a conveyor belt, in a manner similar to the arrangement described in U.S. Pat. No. 10,035,611, for example.

FIG. 1 has a main conveyor 16 leading from the cleaner/bin 12 upwards at an angle to the packing device 20. As added features, this system embodiment 10 includes an optional wood return conveyor 14 for transferring wood pieces that fall off the main conveyor 16 back to the cleaner/bin 12.

In some embodiments, the main conveyor 16 is configured to promote appropriate spacing between individual cleaned wood pieces as they reach the entrance 22 of a generalized embodiment of a packing device 20. The entrance 22 of the packing device 20 is seen in more detail in the inset. In some embodiments, the rate of the main conveyor 16 is adjustable at least in a section adjacent to the packing device 20 to ensure that the wood pieces arrive at the entrance 22 at a suitable rate to promote efficient packing. After the wood pieces arrive at the entrance 22, they are processed by the packing device 20.

The processing will be described in more detail with respect to a detailed embodiment of the packing device 200 which is shown in various views in FIGS. 2 to 7 and the process scheme of FIG. 8, without corresponding system components such as the conveyor and cleaner/bin. It is to be understood that the device 200 and other wood packing device embodiments of the present invention are amenable to incorporation into various wood packaging systems which may have features different from the example system 10 shown in FIG. 1. An additional embodiment of the packing device 300 having different features will then be described with reference to FIGS. 9A to 9D.

Figure 2:
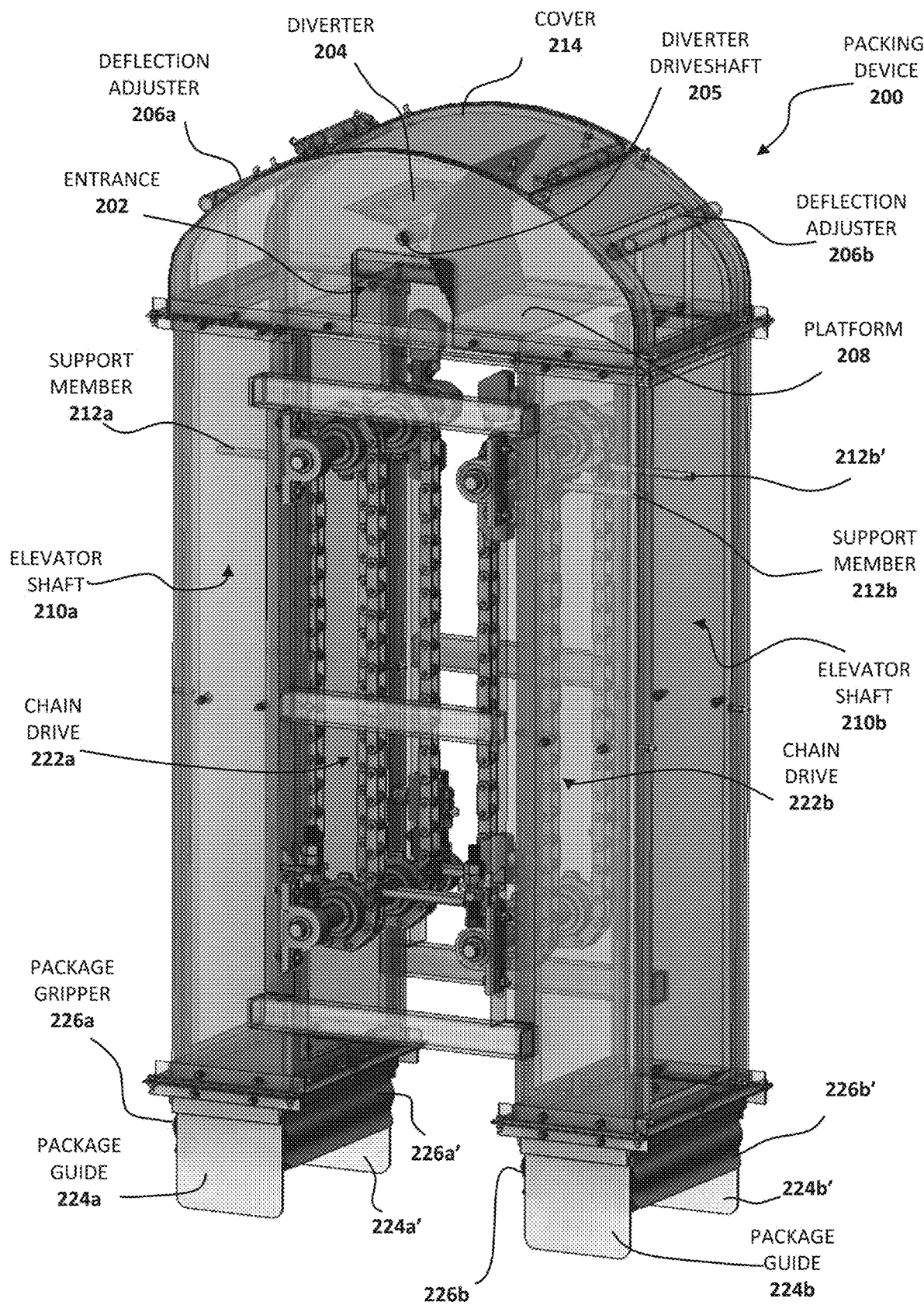
FIG. 2 is a perspective front view of another more detailed embodiment of a packing device 200, in accordance with an aspect of the present disclosure.
Figure 3A:
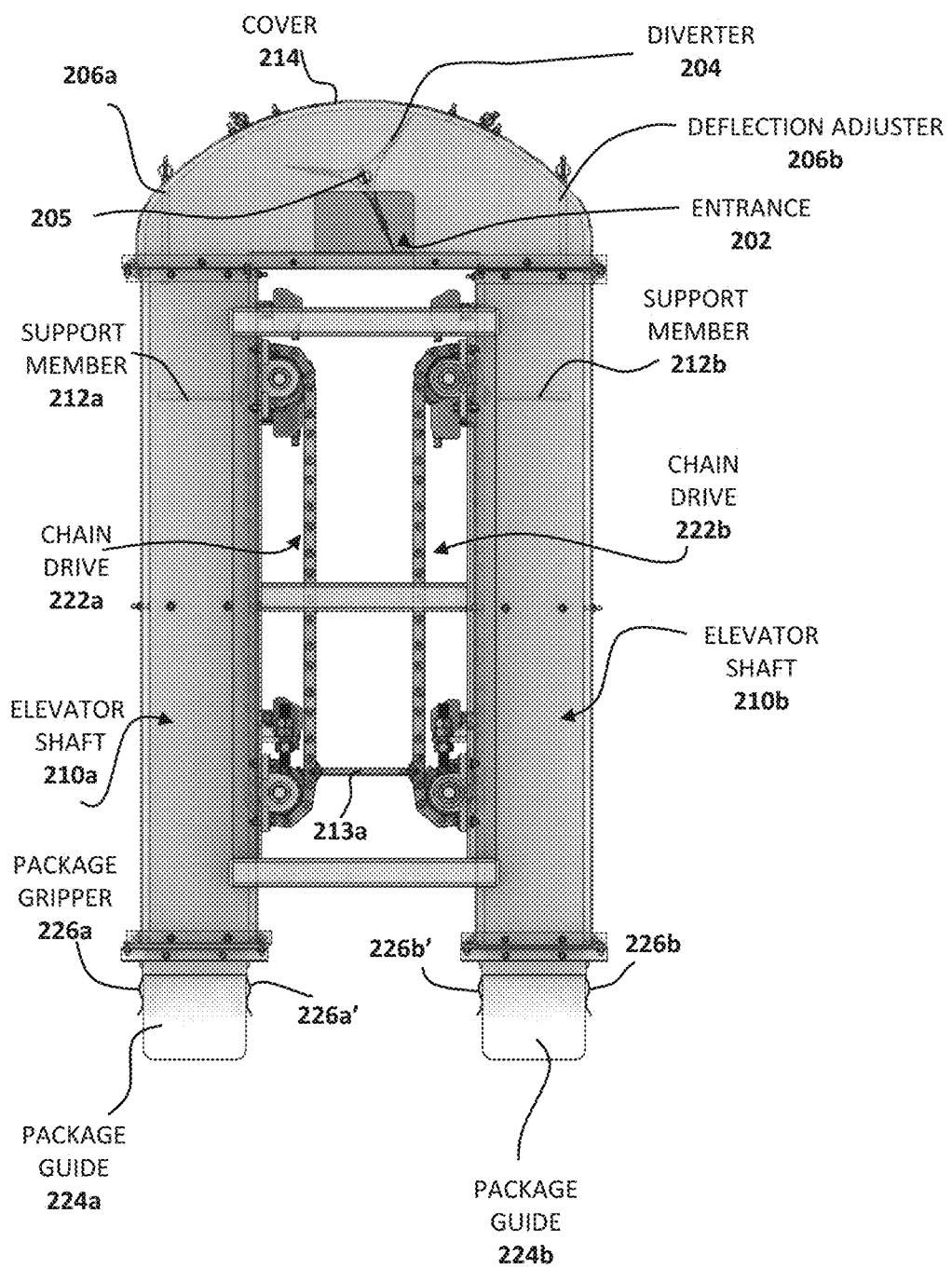
FIG. 3A is a front elevation view of the embodiment of the packing device 200 shown in FIG. 2, in accordance with an aspect of the present disclosure.
Figure 3B:
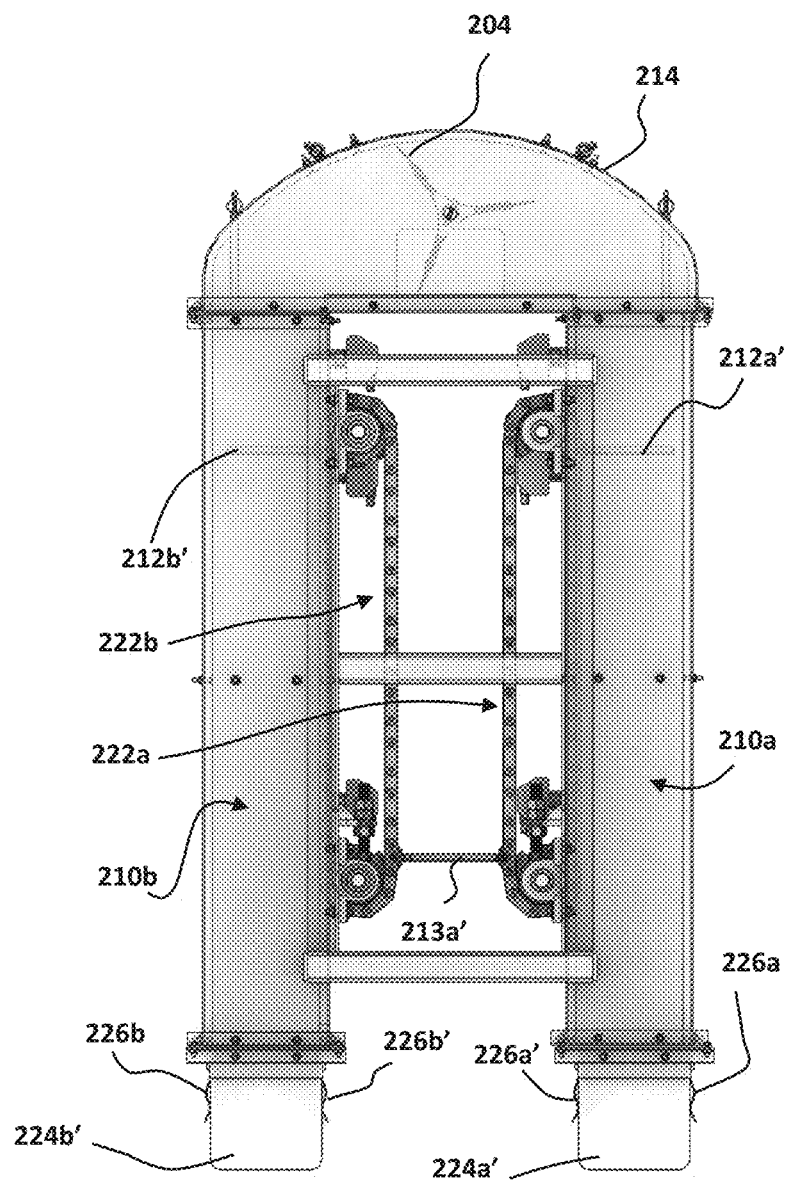
FIG. 3B is a rear elevation view of the embodiment of the packing device 200 shown in FIGS. 2 and 3A, in accordance with an aspect of the present disclosure.

Most of the features of packing device 200 can be seen in the perspective view of FIG. 2, but the additional views shown in FIGS. 3 to 7 help to clarify the arrangement and function of components in the device 200. An entrance 202 is located near the upper end of the device 200 for receiving wood pieces from a conveyor (not shown). When the wood pieces enter the device 200 via the entrance 202, they slide onto a platform 208 disposed at generally the same level as the lower edge of the entrance 202. A diverter 204 is mounted on a driveshaft 205 located above the platform 208. The driveshaft 205 is mounted on vertical walls of a curved cover 214. In this embodiment, the diverter 204 is in the form of a paddlewheel rotating about the axis of the driveshaft 205. The paddlewheel diverter 204 has a length spanning a majority of the width of the inner space inside the cover 214 (as best seen in the top transparent view of FIG. 5A) and is substantially aligned with the entrance 202. The driveshaft 205 is controllable to rotate in either direction to cause the paddlewheel diverter 204 to rotate in either direction to cause wood pieces to be diverted either to the left or right across the platform 208 as described in more detail hereinbelow.

The left and right edges of the platform 208 are adjacent to rectangular upper openings to elevator shafts 210a and 210b which extend downward towards the bottom of the device 200.

The cover 214 has a pair of lateral windows (not labelled) which have corresponding deflection adjusters 206a and 206b extending therefrom. The deflection adjusters 206a and 206b have deflection bars extending downward towards and/or into their corresponding elevator shafts 210a and 210b. When a wood piece is directed towards one of the elevator shafts 210a or 210b, depending upon the speed of the feeding conveyor and the force applied by the diverter 204, the wood piece may either drop directly into the elevator shaft 210a or 210b or strike the corresponding deflection bars of the deflection adjuster 206a or 206b to cause the wood piece to lose horizontal outward momentum and drop into the corresponding elevator shaft 210a or 210b. The deflection adjusters 206a and 206b may be grasped by their upper handles and moved within their respective windows to place the deflection bars at different positions within the upper end of their respective elevator shafts 210a and 210b to place the deflection bars in an appropriate position to deflect wood pieces under the conditions used in a given operation which may require deflection of wood pieces moving at a particular speed or having a particular average mass, for example.

The device 200 includes a pair of chain drives 222a and 222b located medially with respect to the elevator shafts 210a and 210b. The chain drives 222a and 222b are controlled by one or more external motors (not shown in FIGS. 2-7) and operate in an alternative manner i.e. when chain drive 222a is cycling and collecting wood pieces in a stack, chain drive 222b is returning to an initial wood loading position and vice versa, as will be described hereinbelow with reference to FIG. 8. Each of the chain drives 222a and 222b includes a pair of chains (not labelled) which are mounted on one set of driveshafts (not labelled) as shown. Alternative embodiments may use alternative mechanical drive mechanisms such as belt drives, for example.

Each of the chain drives 222a and 222b includes two pairs of support members connected to respective chains. Each pair of support members is provided to form a rack to support the wood pieces as they drop into the corresponding elevator shaft 210a or 210b. Chain drive 222a is associated with support members 212a, 212a', 213a and 213a' and chain drive 222b is associated with support members 212b, 212b', 213b and 213b'. Support member pairs are distinguished with individual support members using a given reference numeral and the same numeral with a prime symbol. The individual support members of a pair are disposed parallel to each other and are connected to separate chains of one of the chain drives. In several of the views of FIGS. 2 to 7, the support members 213a, 213a', 213b and 213b' are not visible or easily discernable because they are located medially within the device 200 and closer to the bottom of the device 200 and/or obscured by other parts. Support members 213a, 213a' 213b and 213b' are however clearly seen in the bottom view of FIG. 5B. In this embodiment of the device 200, the two pairs of support members are located at opposing positions along the chains of each of the chain drives 222a and 222b. For example, support members 212a and 212a' are located at the top left along chain drive 222a and support members 213a and 213a' are located at the bottom right along chain drive 222a. An identical arrangement is provided for chain drive 222b. The advantage of this arrangement is that when one pair of support members is moving out of its corresponding elevator shaft, the other pair of support members is moving into the same elevator shaft and approaching an initial loading position.

It is to be understood that during operation of the device 200, the pairs of support members 212a, 212a', 213a and 213a', 212b, 212b', 213b and 213b' move with the chains of chain drives 222a and 222b because they are connected thereto. A more complete description of movement of the chain drives 222a and 222b and wood pieces will be provided herein below with respect to FIGS. 6A and 6B, as well as FIGS. 8A to 8D.

Figure 7A:
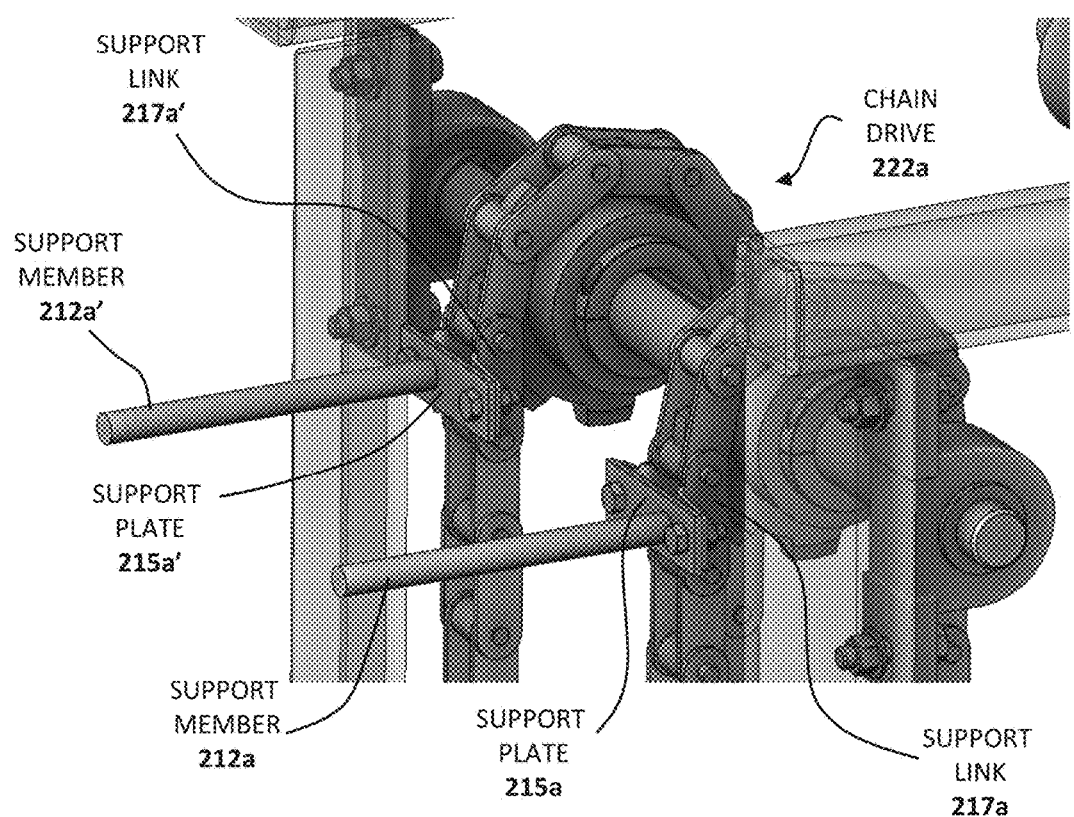
FIG. 7A is a perspective view of a portion of the packing device 200 showing detail of how the support members 212a and 212a' are connected to the chain drive 222a, in accordance with an aspect of the present disclosure.
Figure 7B:
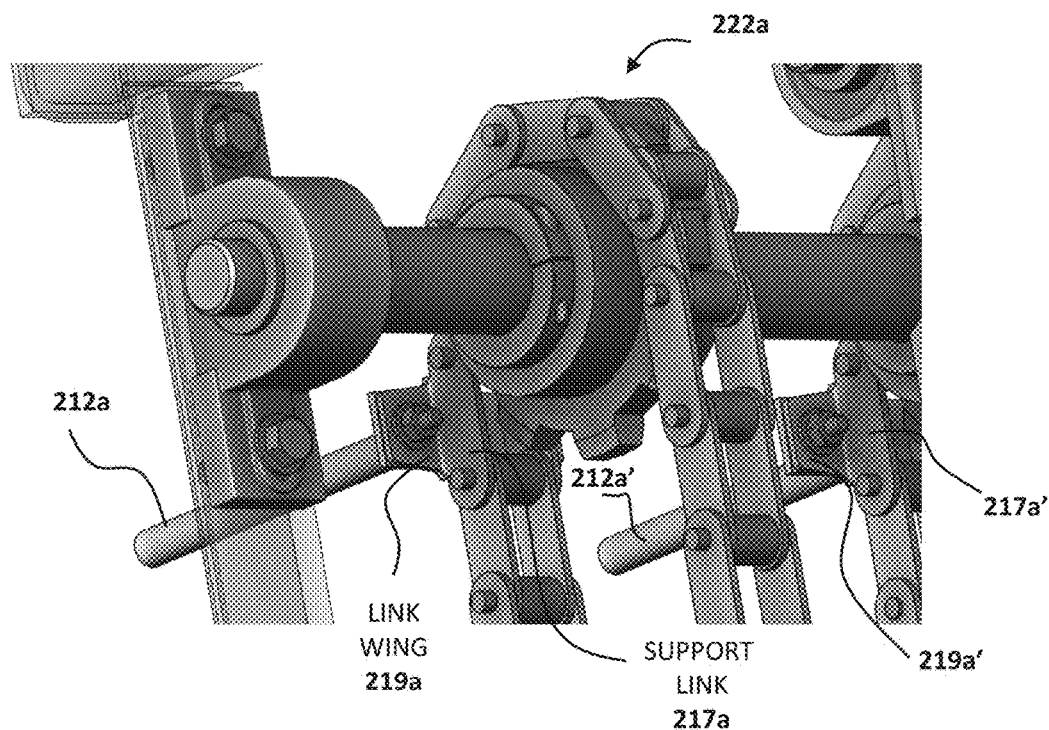
FIG. 7B is a second perspective view of a portion of the packing device 200 showing detail of how the support members 212a and 212a' are connected to the chain drive 222a, in accordance with an aspect of the present disclosure.

The arrangement for connecting the support members 212a, 212a', 213a and 213a', 212b, 212b', 213b and 213b' is seen in the expanded perspective views of FIGS. 7A and 7B where one pair of support members 212a and 212a' is shown in two different perspectives. The support members 212a and 212a' are connected to corresponding support plates 215a and 215a' which themselves are bolted to specialized chain links which have integrally formed link wings 219a and 219a'. It is to be understood that the other pairs of support members 212b, 212b', 213a, 213a', 213b, and 213b' are connected to the chains of the chain drives 222a and 222b in a similar arrangement.

Figure 5A:
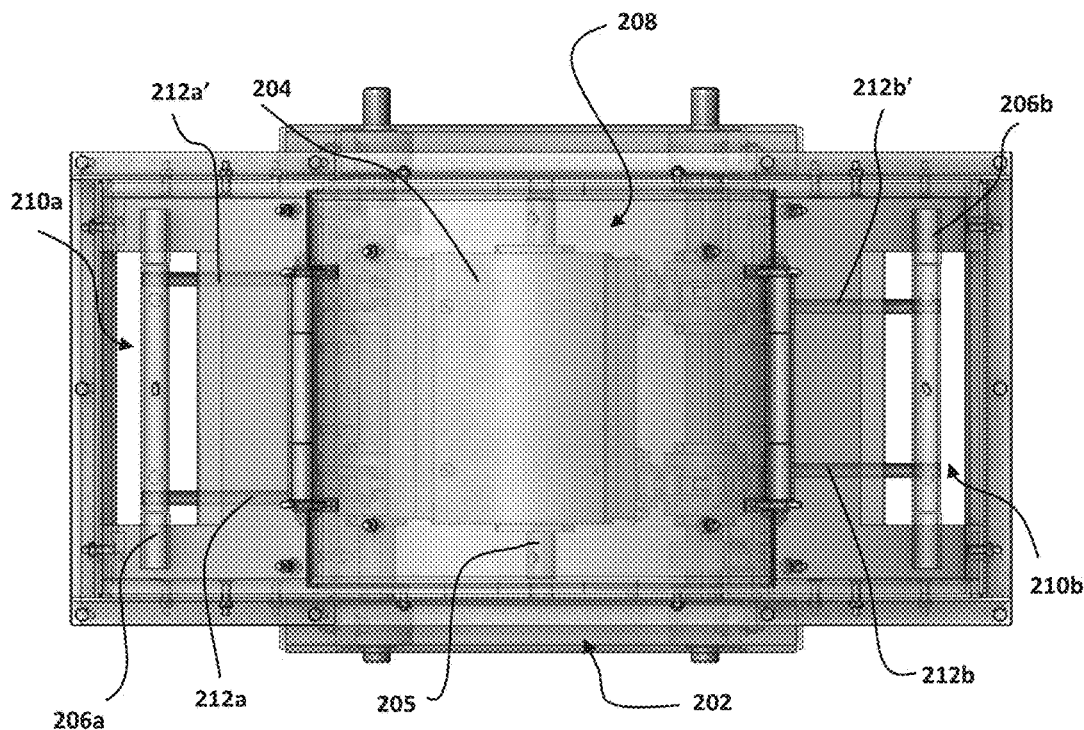
FIG. 5A is a top view of the embodiment of the packing device 200 shown in FIGS. 2, 3A, 3B and 4, in accordance with an aspect of the present disclosure.
Figure 5B:
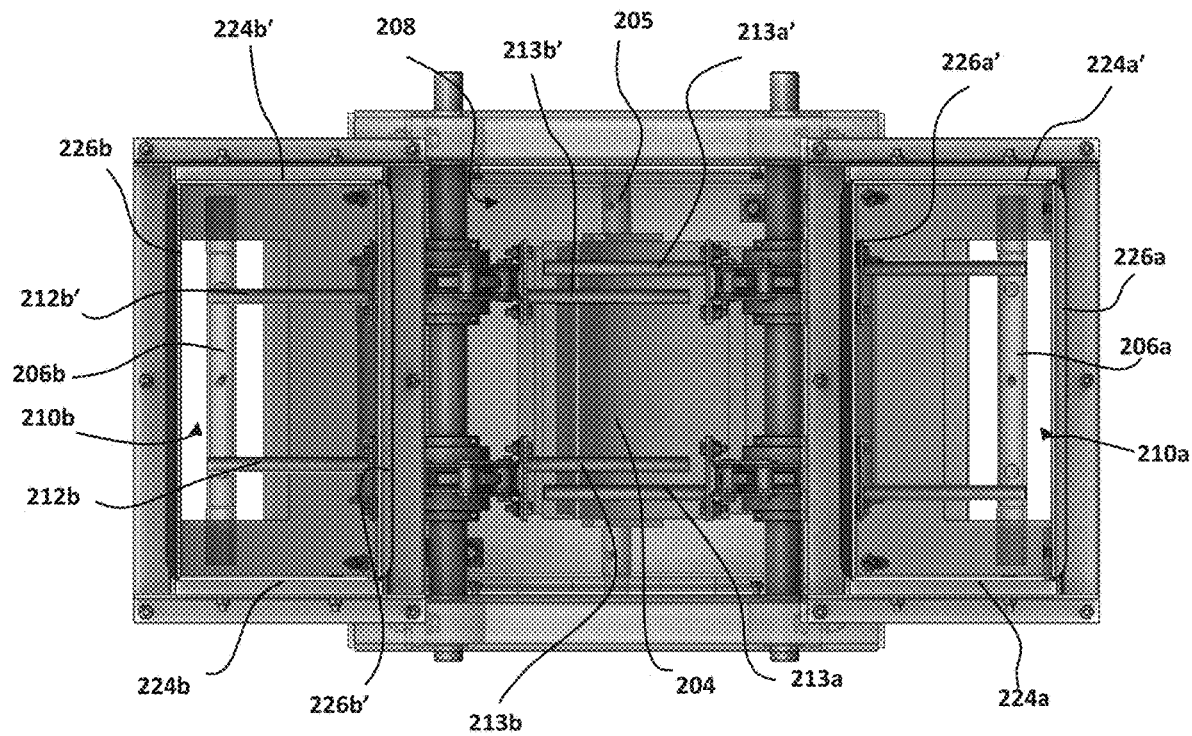
FIG. 5B is a bottom view of the embodiment of the packing device 200 shown in FIGS. 2, 3A, 3B, 4 and 5A, in accordance with an aspect of the present disclosure.

The elevator shafts 210a and 210b have open bottom ends as best seen in the bottom view of FIG. 5B. The rectangular bottom open ends of the elevator shafts 210a and 210b are each provided with opposing package guides 224a, 224a', 224b and 224b' which, in this embodiment are in the form of rigid rectangular structures. The rectangular bottoms of the elevator shafts 210a and 210b are also provided with opposing package grippers 226a, 226a', 226b and 226b' which in this embodiment are resilient curved structures that can be pulled outward to facilitate placement of an empty package over the package guides and released to grip the package on the package guides 224a, 224a', 224b and 224b', holding the empty open package in position to receive a stack of wood pieces. This arrangement is shown in FIGS. 6A and 6B.

General operation of the device 200 will now be described with reference to FIGS. 6A and 6B which show front elevation views of the device 200 with dotted arrows showing the direction of rotation of the diverter 204, as well as an individual wood piece WP and a wood stack WS. The individual wood piece WP and the three pieces of wood in the wood stack WS are shown in cross-section because they are arranged lengthwise (perpendicular to the plane of the page) across the support members 212a and 212a' in FIGS. 6A and 212b and 212b' in FIG. 6B (although only support members 212a and 212b are visible in these views). Each of the views shows a virtual snapshot in time where a single wood piece WP has entered the device 200 via the entrance 202 and has begun to be pushed to the left by the lowermost paddle of the paddlewheel diverter 204 while a relatively small wood stack WS of three wood pieces is supported by one pair of support members. The straight dashed arrows indicate the direction of movement of the wood piece, WP, the wood stack WS and the chain drives 222a and 222b.

Figure 6A:
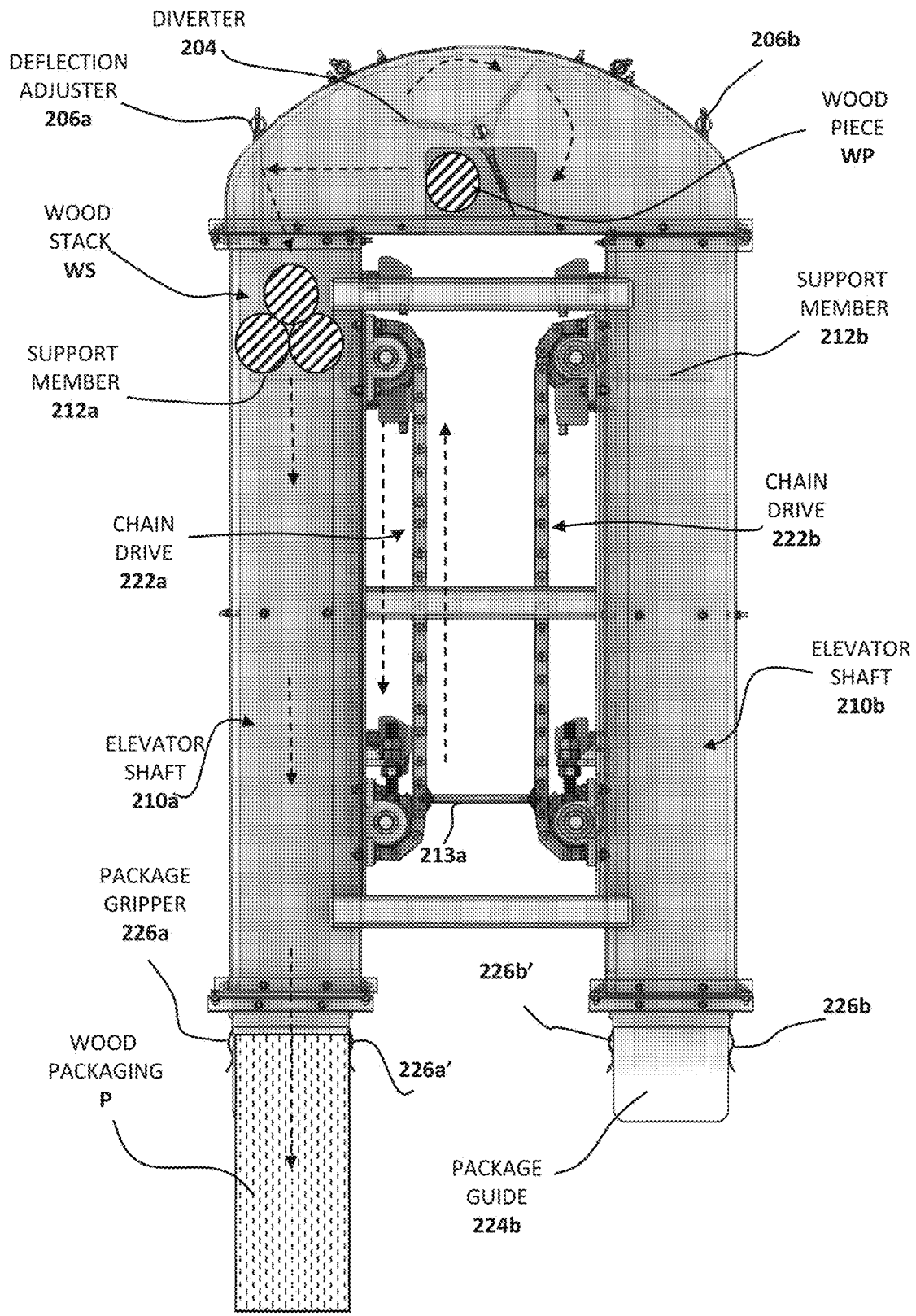
FIG. 6A is a front elevation view of the embodiment of the packing device 200 similar to the view of FIG. 3A and further indicating rotation of the diverter 204 in a clockwise direction to move a wood piece WP to the left to join a wood stack WS accumulating on support members 212a and 212a' within the left chute 210a as the chain drive 222a moves the chain counterclockwise. Wood packaging P is shown attached to the bottom of the chute 210a, in accordance with an aspect of the present disclosure.
Figure 6B:
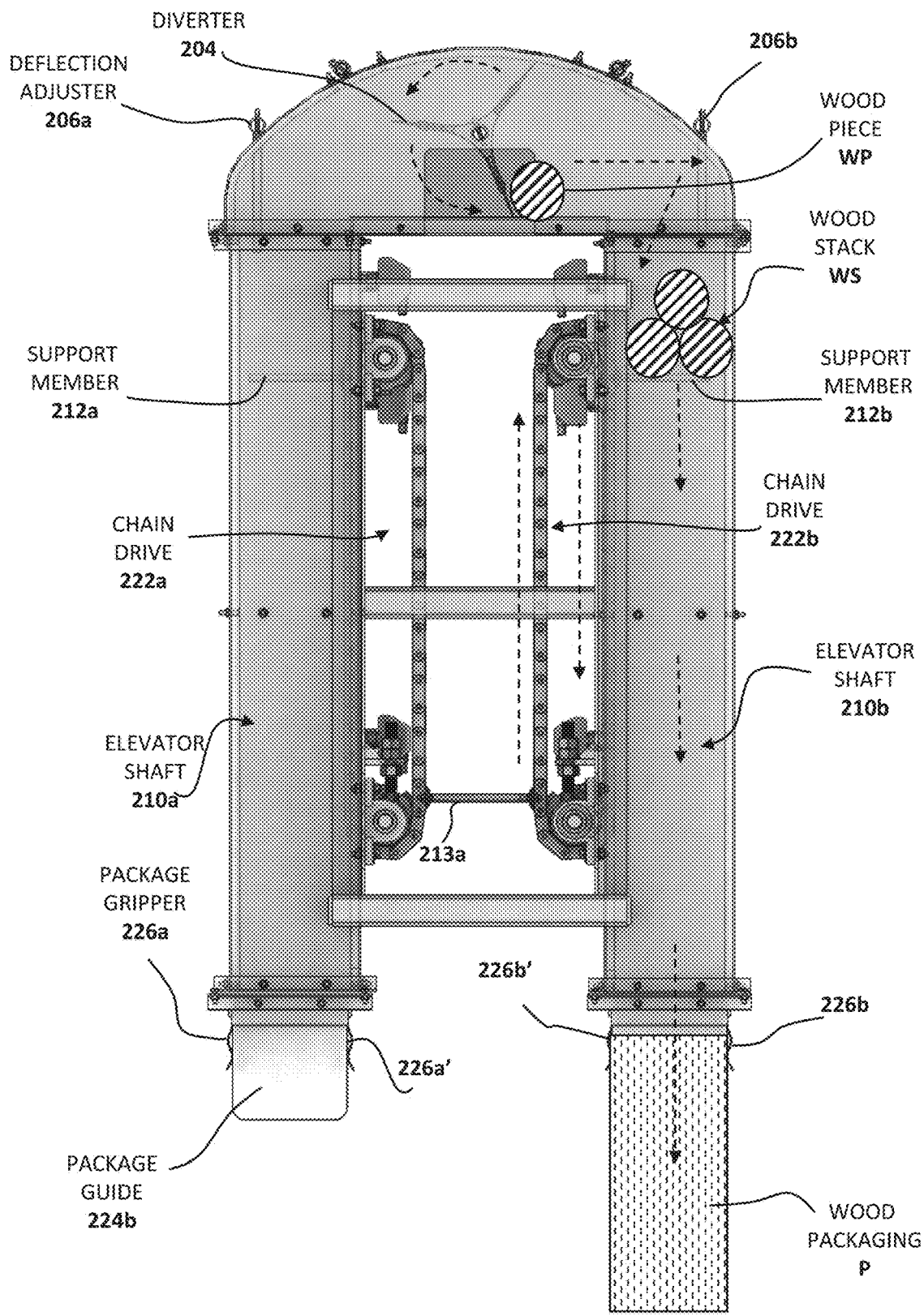
FIG. 6B is a front elevation view of the embodiment of the packing device 200 similar to the view of FIG. 3A and further indicating rotation of the diverter 204 in a counterclockwise direction to move a wood piece WP to the right to join a wood stack WS accumulating on support members 212b and 212b' within the right chute 210b as the chain drive 222b moves the chain in a clockwise direction. Wood packaging P is shown attached to the bottom of the chute 210b, in accordance with an aspect of the present disclosure.

In FIG. 6A, wood packaging P in the form of a flexible container or a bag, is shown attached to the bottom of elevator shaft 210a over the package guides 224a and 224a'

(which are obscured by the wood packaging P and therefore not labelled in FIG. 6A) and held in place by the package grippers 226a and 226a'. The dashed arrows indicate counterclockwise movement of the chain of chain drive 222a, which has the effect of moving the support members 212a, 212a', 213a and 213a'. The movement of chain drive 222a is driven by a dedicated motor (not shown) which may be programmed to be controlled by events detected by sensors, as described in more detail hereinbelow, with respect to FIGS. 8A to 8D. In an arbitrary initiation of operation, the paddlewheel diverter 204 does not rotate until wood piece WP is conveyed into the entrance 202 and between the two lower paddles of the paddlewheel diverter 204. This action triggers a diverter sensor (not shown) to start clockwise rotation of the paddlewheel diverter 204, causing the wood piece WP to be pushed toward the left, causing it to slide along the platform 208, strike the deflection bars of the deflection adjuster 206a, fall into the elevator shaft 210a and land on the wood stack WS which is supported by support members 212a and 212a'. In this particular embodiment, the paddlewheel diverter 204 has three equi-spaced paddles. During operation, the paddlewheel diverter 204 remains in a static position with lower adjacent paddles facing outward to allow a wood piece to occupy the space between these two paddles. When a wood piece reaches this position, a sensor (not shown) detects the wood piece and transmits this detection event to a controller which sends a signal to rotate the diverter 204 by about 120 degrees, thereby causing one of the lower paddles to strike the wood piece and send it into one of the elevator shafts. After rotating 120 degrees, the rotation stops. The new position of rotation of the paddlewheel provides a lower space to be occupied by the next wood piece conveyed into the device via the entrance 202.

With appropriate calibration of the rate of entrance of wood pieces WP and the rate of cycling of the chain drive 222a to lower the support members 212a and 212a' and the wood stack WS, the wood stack WS grows in size at an appropriate rate within the elevator shaft 210a until the support members 212a and 212a' reach the bottom of the chain drive 222a. As the links holding the support members 212a and 212a' reach their lowermost positions along the sprockets of the chain drive, they will be oriented vertically with their ends pointing downwards. This removes all support for the wood stack WS, causing it to drop into the wood packaging P. In one embodiment, the chain drive 222a is programmed to stop just before the support members 212a and 212a' begin angling downwards. This provides a pause in the operation, to allow time for a worker to get ready for the stack to drop into the packaging. The worker then manually actuates continued movement of the chain drive 222a via a manual actuation mechanism such as a button or foot pedal, which then moves at a faster rate to drop the stack quickly. Operation of chain drive 222b is programmed to operate in a similar manner.

At this stage, the worker will remove the wood packaging P containing the wood stack WS. In alternative embodiments, an additional automatic device or robot are provided to perform this task. At this stage, the second pair of support members 213a and 213a' has reached the top sprocket of the chain drive 222a and then moves downward within the elevator shaft 210a to a position appropriate to receive a wood piece WP to initiate the growth of another wood stack WS. In this embodiment, the chain drive continues at the faster rate until the support members 213a and 213a' reach an initial loading position within the elevator shaft 210a and then the chain drive pauses until loading of a new stack in elevator shaft 210a begins again.

In FIG. 6B, the operation is similar to the operation described for FIG. 6A except that the paddlewheel diverter 204 rotates counterclockwise, to push the wood piece WP to the right to send it into elevator shaft 210b. Chain drive 222b cycles clockwise to move the two pairs of support members 212b, 212b', 213b and 213b' as the wood stack WS grows larger until support members 212b and 212b' reach the bottom of the chain drive 222b and release the wood stack WS to allow it to fall into wood packaging P which is attached to package guides 224b, 224b' and package grippers 226b and 226b'.

As noted above, calibration of rates of conveyance of individual wood pieces and the rates of cycling of the drive chains will help to ensure smooth operation and this is conveniently established with basic adjustment of the conveyance rate provided by the main conveyor feeding wood pieces into the entrance 202 of the device 200 and the rate of cycling of the chain drives 222a and 222b.

Advantageously in some embodiments, sensors are provided to control the operation of the motors rotating the chain drives 222a and 222b and the main conveyor. Such sensors may be provided in various locations. For example, sensors such as laser/detector pairs, for example, may be provided in the elevator shafts to detect when the lowest supported position of a pair of support members near the bottom of the chain drive is reached. In an alternative embodiment, similar sensors may be placed near the top of the elevator shafts to detect when the initial loading position of a pair of support members is reached. It is to be understood that in various embodiments of the packing device, the positions of the sensors can be selected with consideration of individual device design choices and overall calibration of operation of the device will take into consideration these alternative sensor positions.

Advantageously in some embodiments, the device 200 operates with automatic cycling between packing wood stacks in both elevator shafts 210a and 210b. The advantage of provision of automatic cycling between the two elevator shafts 210a and 210b is that the strain of operation of the system is shared between the two sides of the device 200. Any combination of cycling may be performed according to the needs of the operator. For example, in one process embodiment, an entire wood stack may be formed in one elevator shaft before another stack begins to be formed in the other elevator shaft. In another process embodiment, the stacks may be formed with alternating stacking of any number of wood pieces in one given elevator shaft before shifting to stacking in the other elevator shaft. For example, four wood pieces could be stacked in the left elevator shaft 210a and then four wood pieces could be stacked in the right elevator shaft 210b and this process would continue until full stacks would be formed in each of the elevator shafts 210a and 210b.

As noted, the irregular nature of wood pieces makes consistent conveyance and stacking a challenging endeavor. The inventor has developed the present invention in recognition that it is challenging to develop a wood packaging device which does not occasionally experience jamming as a result of improper stacking of wood pieces. Stopping operation of the device to address these issues results in production losses which are particularly undesirable in large scale wood packing operations. In developing a device having more than one wood stacking area, if an obstruction prevents proper stacking of wood pieces in one of the stacking areas, the obstruction may be automatically or manually detected, and the stacking process can then be switched to another stacking area. In some embodiments, when the obstruction is automatically detected the device is automatically configured to stop the cycling of the chain drive in the obstructed elevator shaft and to switch the diverter to load the other elevator shaft immediately after the initial loading position in that elevator shaft is attained. In some embodiments, detection of the obstruction is accompanied by an alert signal such as an audible or visible signal to alert a worker to remove the obstruction. In other embodiments all steps are performed manually after sensor-based detection of the obstruction.

Figure 4:
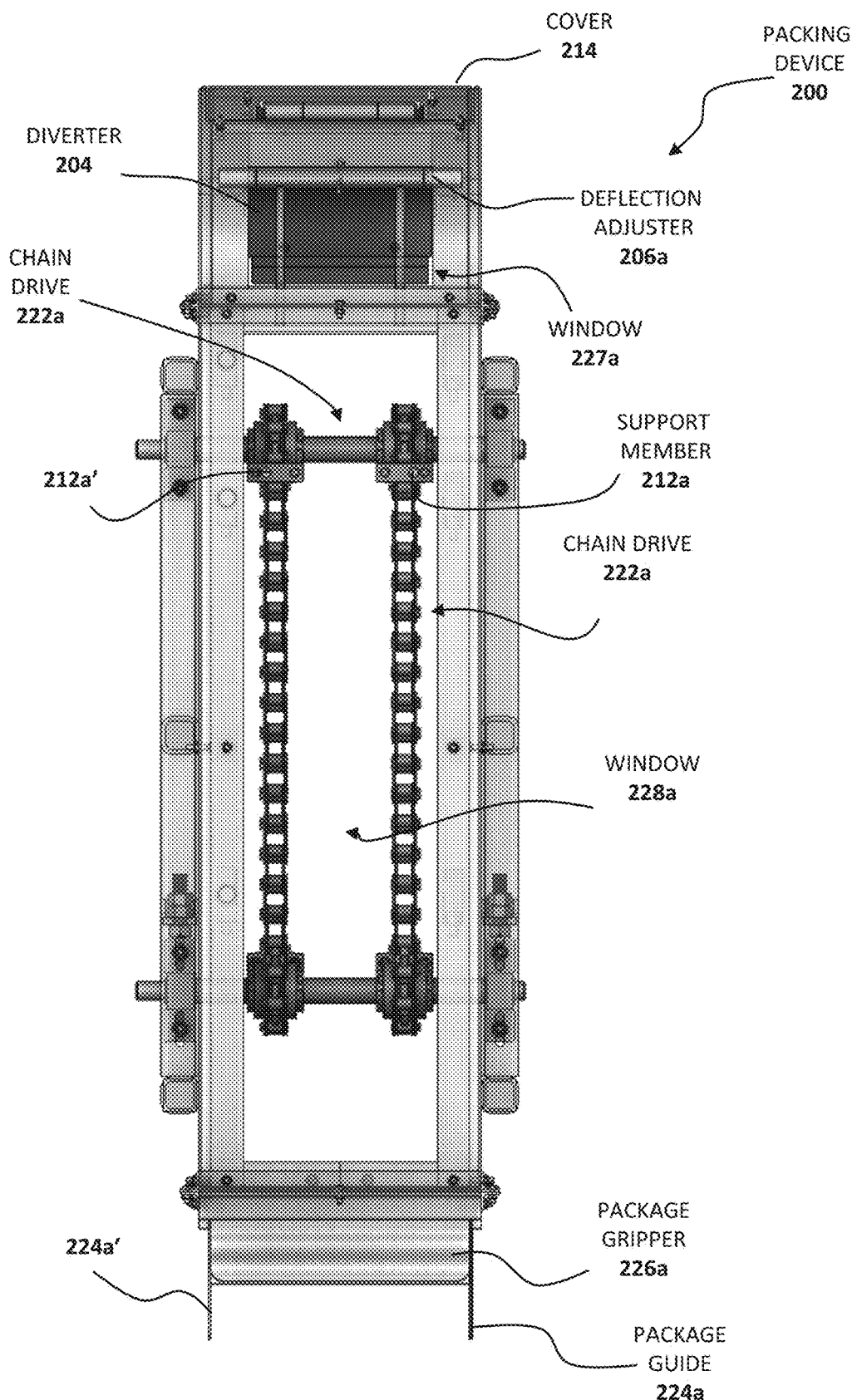
FIG. 4 is a side elevation view of the embodiment of the packing device 200 shown in FIGS. 2, 3A and 3B, specifically a left side elevation with respect to the orientation shown in FIG. 3A, in accordance with an aspect of the present disclosure.

Advantageously, the example embodiment of device 200 described herein has stacking areas represented by elevator shafts with lateral windows. An example is seen in the side elevation view of FIG. 4 showing lateral window 228a which permits chain drive 222a to be seen. While an equivalent lateral view of the opposite side of the device is not included in the drawings, it is to be understood that it also has a similar lateral window. The lateral windows allow a worker to easily gain access to each of the elevator shafts 210a and 210b to address any problems arising from obstructions that could prevent the chain drives 222a and 222b from operating as intended. Furthermore, obstructions may occur near the top of the device in the vicinity of the diverter 204 and such obstructions may be addressed by a worker gaining access to this area via the top windows formed in the cover 214, of which upper window 227a of FIG. 4 is an example. While not labelled in the present drawings, there is a similar upper window on the opposite side of the cover 214 as can be seen in FIGS. 2, 5A and 5B. In addition to the top windows and lateral windows, it is easily seen in the views of FIGS. 2-6 that the device has large front and back central windows (not labelled) to provide access to the chain drives 222a and 222b for convenient maintenance and repair.

In some embodiments, the chain drives are provided with at least two main speed settings to enhance the package filling action. An example of operation of the device 200 using two main speed settings and generating wood packages using both chain drives 222a and 222b is shown in schematically in FIGS. 8A to 8D where only the main mechanical components are shown in a simplified manner to preserve clarity. It is to be understood that this represents only one possible process of operation and that alternative processes are possible and such alternatives may employ sensors located at alternative positions. Furthermore, while the present process describes continuous movement of both chain drives 222a and 222b after an initial series of start-up steps, alternative processes may include steps which involve repeated stopping and starting of the chain drives 222a and 222b. However, it is advantageous in most cases to cycle successively between generation of a first wood stack in the first elevator shaft, followed by generation of a second wood stack in the second elevator shaft, followed by generation of third wood stack in the first elevator shaft, and so on, as noted above, to share the strain of operation of the device 200 between the two operable sides of the device 200. Finally, it is to be understood that the paddlewheel diverter 204 does not rotate continuously. Instead, as noted above, it rotates 120 degrees with each sensor-based detection of a wood piece arriving on the platform 208 between the open space between the two lowermost paddles of the paddlewheel diverter 204. This timed movement of the paddlewheel diverter 204 prevents the paddles from blocking entry of a firewood piece onto the platform 208.

FIGS. 8A to 8D illustrate one possible manner of operating the device 200 which begins from a point where the device 200 is not operating (Step A) and illustrates initiation of operation on the left side of the device 200 (Step B), followed by operation of the right side of the device 200 (Step D) and then cycling between the left and right sides of the device 200 in a manner where both chain drives 222a and 222b continue running as the operation cycles between steps D and G.

Figure 8A:
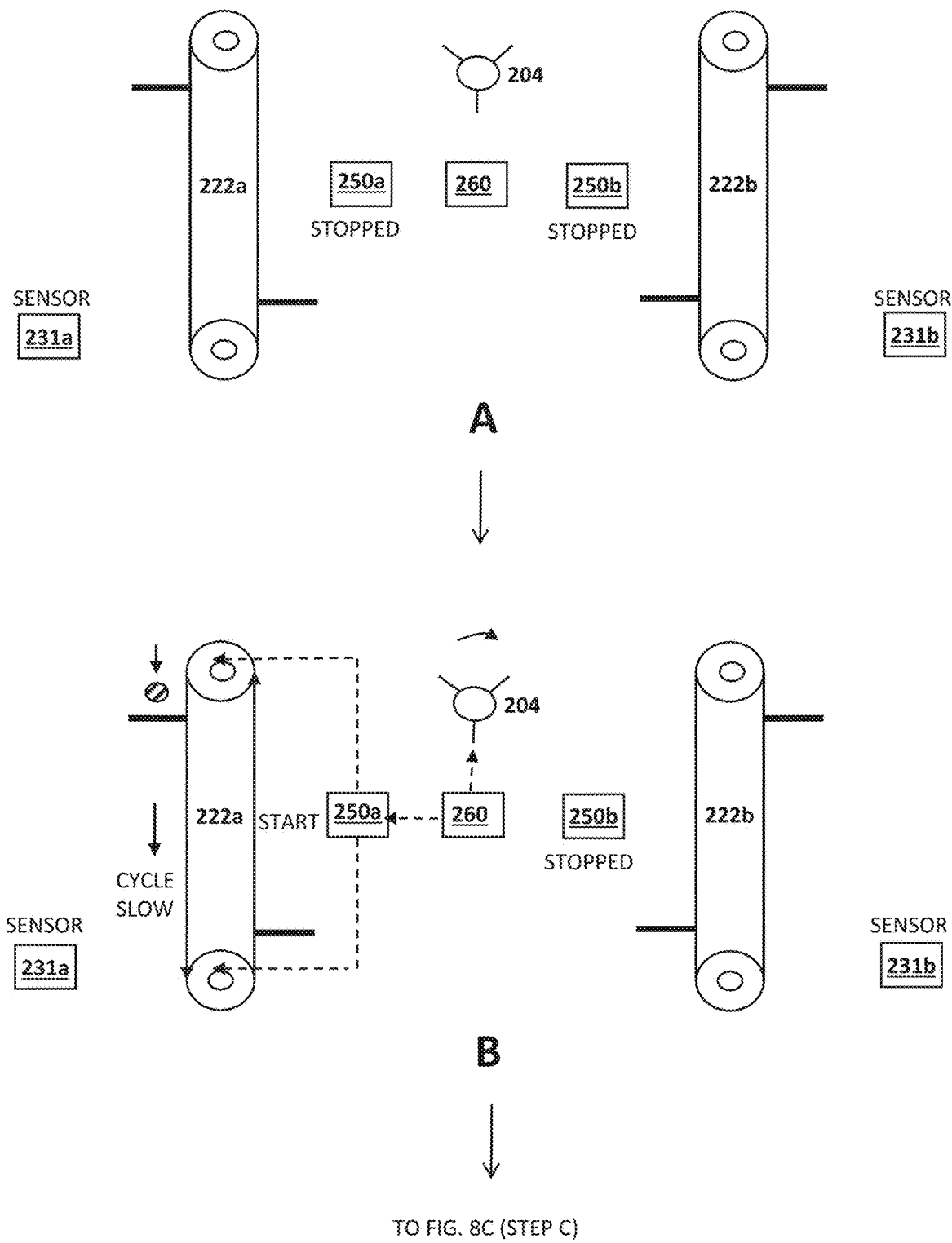
FIG. 8A shows an example of two initial steps (Steps A and B) in operation of the packing device 200 in a process including Steps A to G with subsequent cycling through Steps D to G, in accordance with an aspect of the present disclosure.

In Step A shown in FIG. 8A, the device 200 is not operating. The components shown are the chain drives 222a and 222b, a central controller 260 which may be configured for programmed automatic operation or manual operation, motors 250a and 250b for running the chain drives 222a and 222b, respectively, and sensors 231a and 231b for detecting a position attained by the support members (shown in dark lines). Also shown schematically is the diverter 204 which is not rotating in Step A. In this example embodiment, the sensors 231a and 231b are shown near the bottom of the chain drives 222a and 222b, but it is to be understood that due to the cyclic nature of operation of the device, the sensors 231a and 231b may be placed at different locations in the device 200 for detecting different stages of operation of the device 200.

In Step B, shown in FIG. 8A, operation of the device is initiated by the controller 260 which sends a command to start motor 250a to begin cycling chain drive 222a in the slow cycle speed. The controller 260 also sends a command to begin rotating the diverter 204 clockwise (as shown by the curved arrow). The direction of cycling of chain drive 222a is shown by solid arrows and the long-dashed arrows indicate commands to motor 250a, chain drive 222a and diverter 204. As the operation of the device 200 is initiated, feeding of wood pieces into the device begins and this is indicated by the cross-hatched circle dropping downward toward the leftmost supports (represented by a dark solid line) as shown. Chain drive 222b is not yet cycling in step B.

Figure 8B:
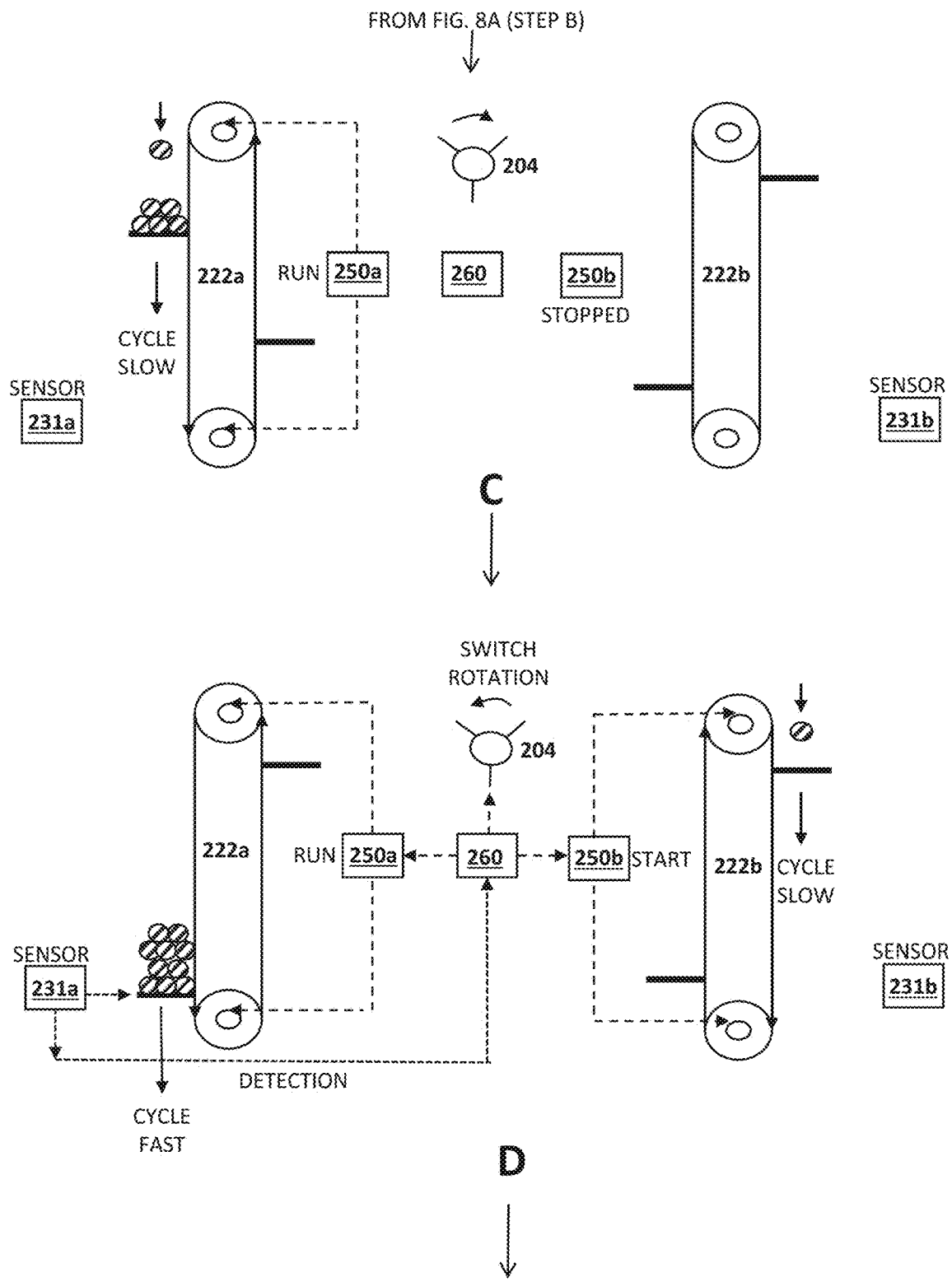
FIG. 8B shows an example of two intermediate steps (Steps C and D) in operation of the packing device 200 in a process including Steps A to G with subsequent cycling through Steps D to G, in accordance with an aspect of the present disclosure.
Figure 8C:
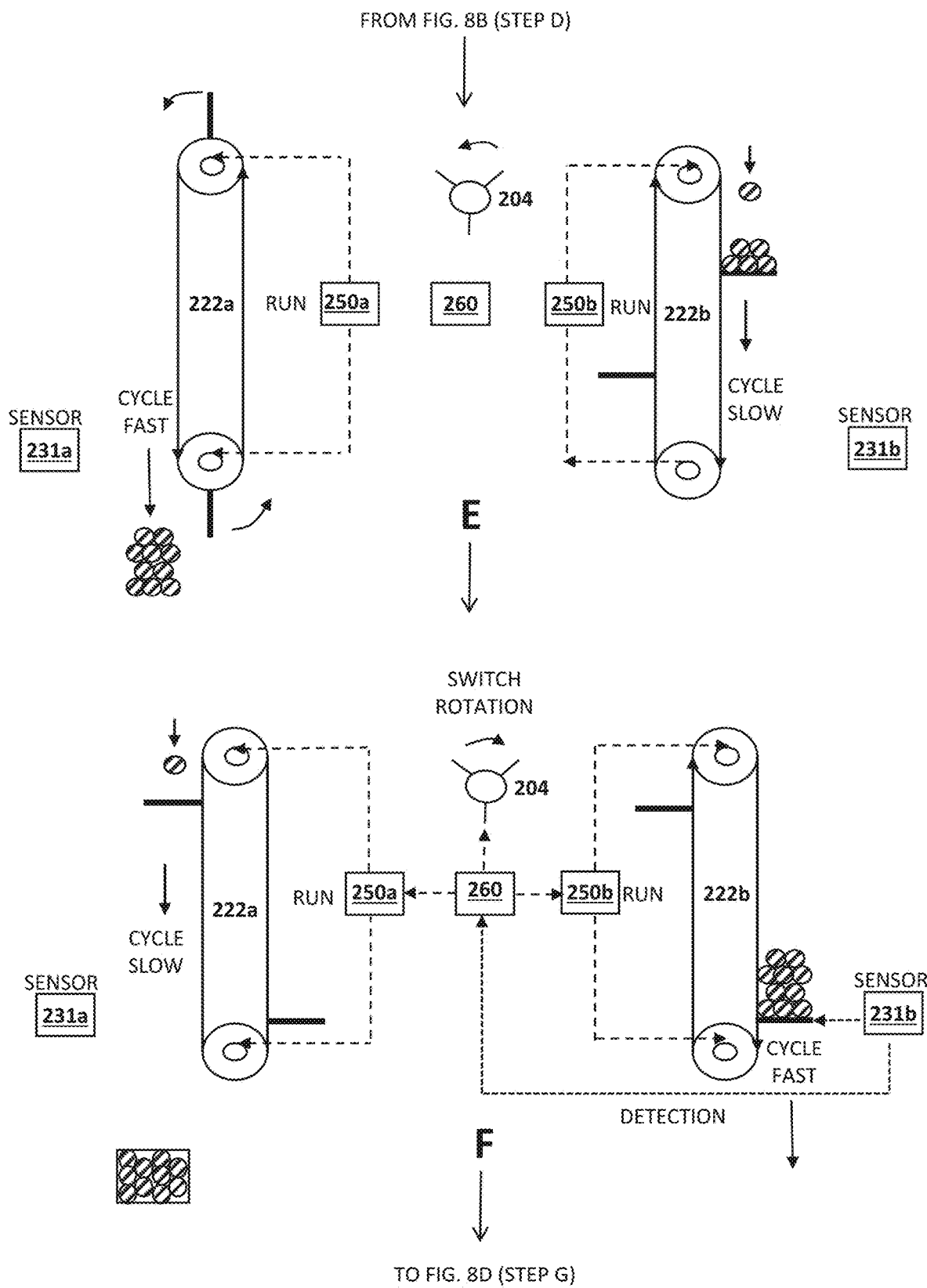
FIG. 8C shows an example of two intermediate steps (Steps E and F) in operation of the packing device 200 in a process including Steps A to G with subsequent cycling through Steps D to G, in accordance with an aspect of the present disclosure.

FIG. 8B is a continuation of the process from step B of FIG. 8A and step B transitions to step C. In Step C, the leftmost pair of support members (solid black line) holds a growing stack of wood pieces which has moved downward with the downward movement of chain drive 222a while wood pieces continue to drop onto the stack after being pushed by the diverter 204 rotating clockwise. Chain drive 222b is still not yet cycling in step C.

In Step D (FIG. 8B), the leftmost pair support members (solid black line) has a full stack of wood pieces and has reached a position near the bottom of the chain drive 222a where it triggers sensor 231a as indicated by the short horizontal arrow. Sensor 231a then sends a detection signal to the central controller 260 which is programmed to perform three operations (indicated by dashed arrows extending from the controller 260 either simultaneously or in relatively fast succession as follows (not necessarily in any particular order); (i) a command is sent to motor 250a to change the cycle speed of chain drive 222a to a faster speed to quickly remove support for the completed wood stack and cause the completed wood stack to drop smoothly into the attached packaging (because, without the increased cycling speed, the slower movement of the support members might cause the stack to become unbalanced and cause wood pieces to become crooked as they drop into the attached packaging, which could cause uneven packing of the stack within the package); (ii) start chain drive 222b running in the slower cycle speed; and (iii) switch the rotation of the diverter 204 to counterclockwise. In some embodiments, the switch of the chain drives 222a and 222b to the fast cycle speed may be accompanied by a pre-programmed command to immediately return to the slow cycle speed after a suitable period for dropping the wood stack is complete. In other embodiments, the switch of the chain drives 222a and 222b to return to the slow cycle speed is linked to another sensor detection event, as described hereinbelow. The switch of rotation of the diverter 204 to counterclockwise is indicated by the curved arrow and it is to be understood that this causes wood pieces to be diverted to the right side of the device 200 where they are collected on support members (solid black line) linked to chain drive 222b.

Step E (FIG. 8C) follows Step D. Chain drive 222a continues to cycle at the fast speed and the wood stack drops away from the pair of supports which are shown pointing vertically downward (solid black line). The wood stack is collected in a package. The diverter 204 continues to rotate counterclockwise to send wood pieces to the support members (solid black line) linked to chain drive 222b (the positioning of chain drive 222b and the stage of growth of the wood stack is analogous to that of chain drive 222a in Step C).

In Step F (FIG. 8C) the rightmost support (solid black line) has a full stack of wood pieces and has reached a position near the bottom of the chain drive 222b where it triggers a sensor 231b (indicated by the short horizontal arrow). The sensor 231b sends a detection signal to the central controller 260 which is programmed to perform three operations either simultaneously or in relatively fast succession as follows (not necessarily in any particular order); (i) a command is sent to motor 250b to change the cycle speed of chain drive 222b to a faster speed (to more effectively drop the stack of wood as described above); (ii) return chain drive 222a to run in the slower cycle speed; and (iii) switch the rotation of the diverter 204 back to clockwise. As noted above, in some embodiments, the switch of the chain drives to the fast cycle speed may be accompanied by a relatively fast command to return to the slow cycle speed. The switch of rotation of the diverter 204 back to clockwise is indicated by the curved arrow and it is to be understood that this causes wood pieces to be diverted back to the left side of the device where they are collected on support members (solid black line) linked to chain drive 222a.

Figure 8D:
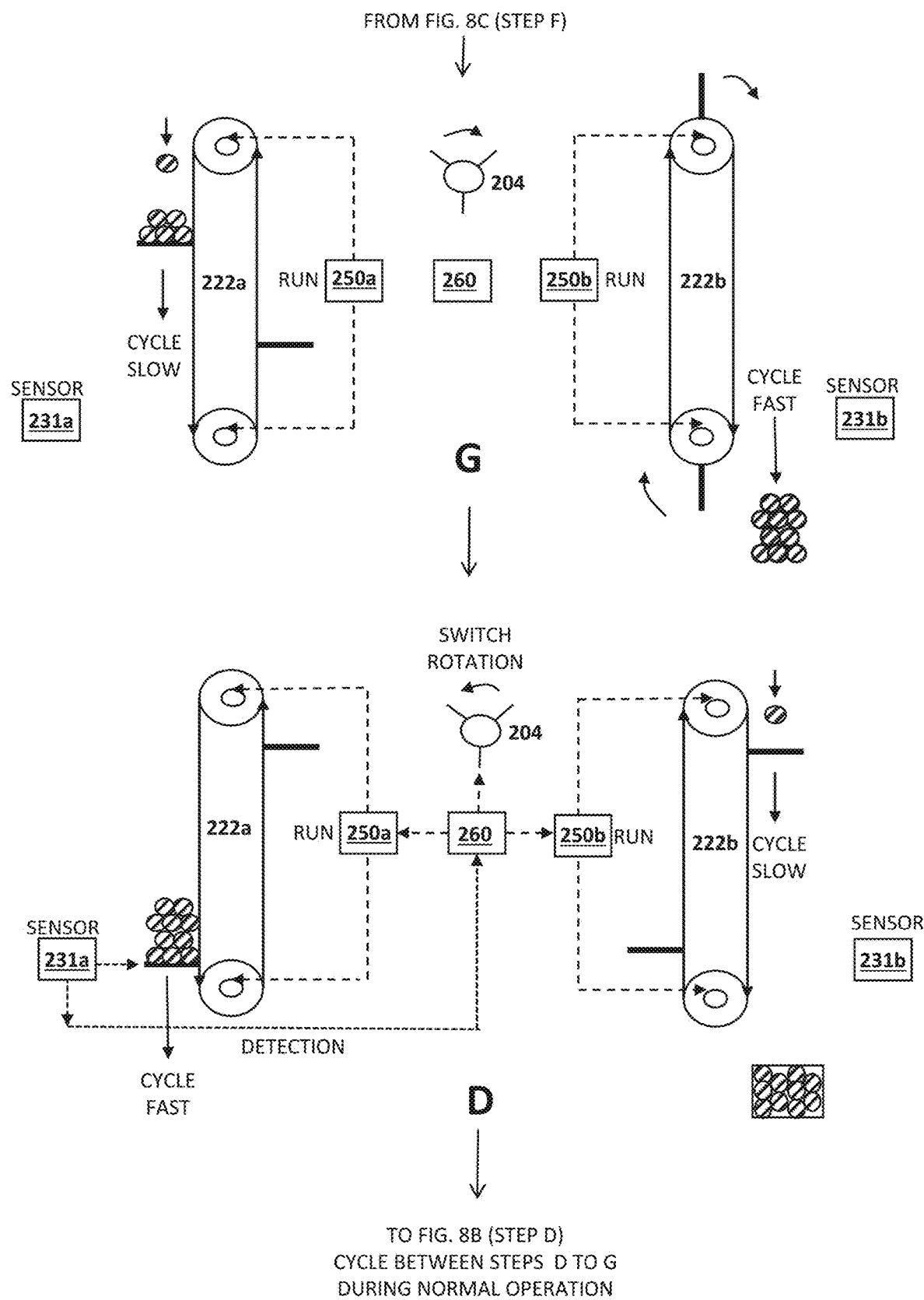
FIG. 8D shows an example of a final step (Step G) followed by a return to Step D (as previously shown in FIG. 8B) in operation of the packing device 200 in a process including Steps A to G with subsequent cycling through Steps D to G, in accordance with an aspect of the present disclosure.
Figure 9A:
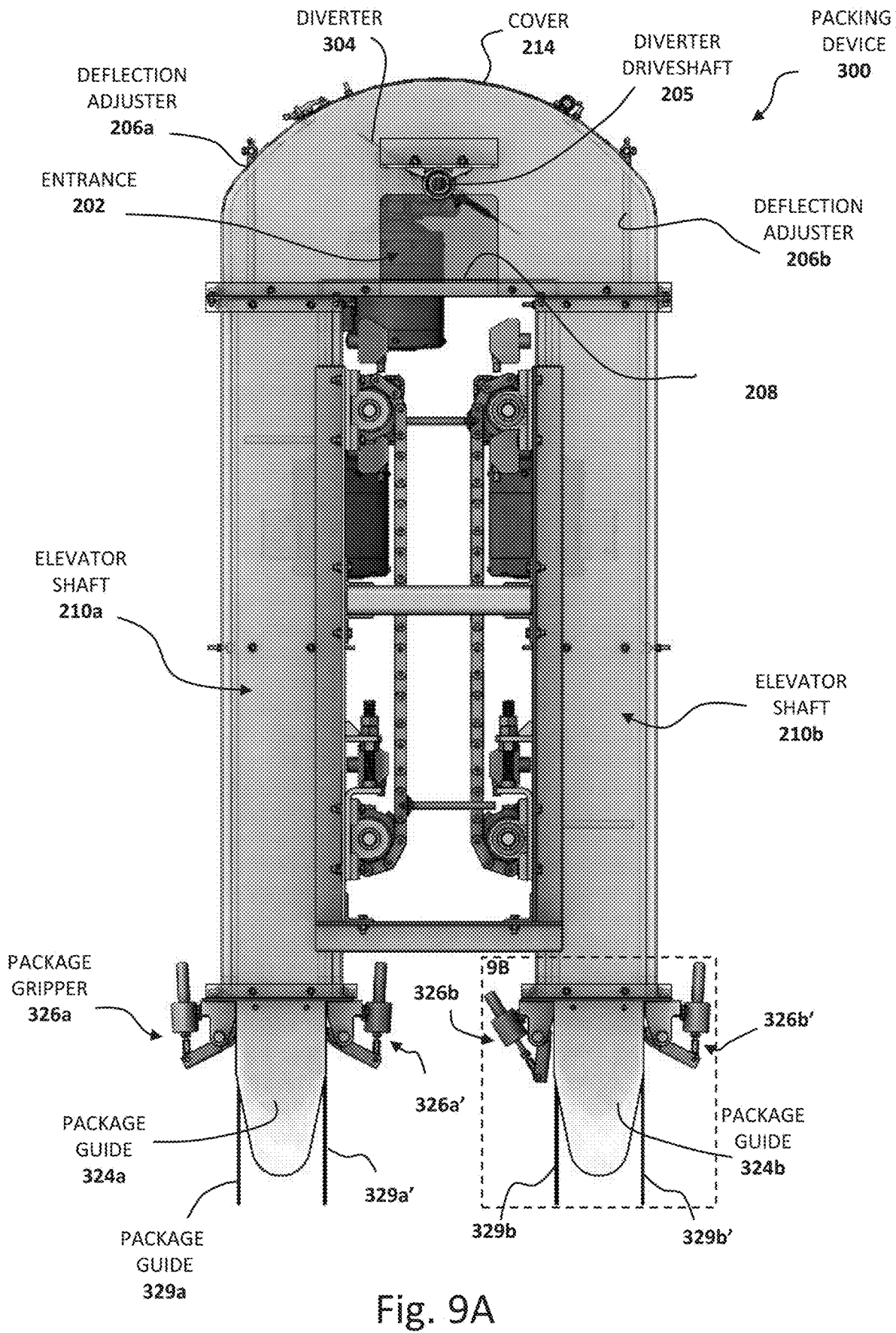
FIG. 9A is a front elevation view of another embodiment of the packing device 300, in accordance with an aspect of the present disclosure.

In Step G (in FIG. 8D), the function of chain drive 222a and the intermediate position of the support members and wood stack is similar to its position in Step C. Chain drive 222b continues to cycle at the fast speed and the wood stack drops away from the support members (solid black line which is shown pointing vertically downward). The diverter 204 continues to rotate counterclockwise to send wood pieces to the support members (solid black line) linked to chain drive 222a (the positioning of chain drive 222b and the stage of growth of the wood stack is analogous to that of chain drive 222a in Step E). After step G the operating cycle of the device returns to step D, as indicated in FIG. 8D and cycling during normal continuous operation will follow a cycle of Step D to Step E to Step F to Step G and a return to Step D. Steps A to C are not included in the continuous operating cycle as they are steps used in starting up the process (for example, chain drive 222b does not start running until Step D). FIGS. 9A to 9D illustrate alternative features of another embodiment of the packing device 300. In FIGS. 9A to 9D, the alternative features are labelled using reference numerals in the 300 series while features which are similar or essentially identical to the features of embodiment 200 are labelled using reference numerals in the 200 series. For example, the cover 214 shown in FIGS. 9A and 9D is essentially identical in embodiments 200 and 300 while the diverter 304 of embodiment 300 is different than the diverter 204 of embodiment 200. It is thus seen in FIG. 9A, that the different features relate to the diverter 304, the package grippers 326a, 326a', 326b, 326b', and the package guides 324a, 325a', 324b, 324b', 329a, 329a', 329b, 329b.

It is seen in FIG. 9A and also in FIG. 9D that the diverter 304 has two opposed paddles, giving it a generally flat rectangular structure with a wider central portion for insertion of the diverter driveshaft 205. It is believed that this two-paddle arrangement provides advantages over the three-paddle diverter 204 of embodiment 200 in reducing a requirement for accurate calibration of paddle movement to avoid having one of the three paddles block a wood piece from entering the device and moving onto the platform 208 which would impede the desired stacking and packaging functions (reducing the number of paddles from three to two reduces the likelihood of such blockage occurring). Otherwise, the diverter 304 operates in a manner similar to the diverter 204 of embodiment 200 with the clockwise and counterclockwise rotation as described with reference to FIGS. 6A and 6B. In the perspective view of FIG. 9D, where it is seen that the width of the opposed paddles of the diverter 304 spans a majority portion of the width of the space above the platform 204.

It is also seen in FIG. 9A that the portions of the device 300 located below the elevator shafts 210a, 210b have additional modifications relative to device 200, which are shown in a magnified view in FIG. 9B and a perspective view in FIG. 9C. Instead of the package grippers 226a, 226a', 226b, 226b' of embodiment 200, embodiment 300 has extra sets of lateral package guides 329a, 329a', 329b, 329b' which, in this particular embodiment, are longer than the front package guides 324a, 324b in combination with package grippers 326a, 326a', 326b, 326b'. There are also rear package guides 324a' and 324b' identical to the front package guides 324a, 324b which are not visible in the views shown.

Figure 9B:
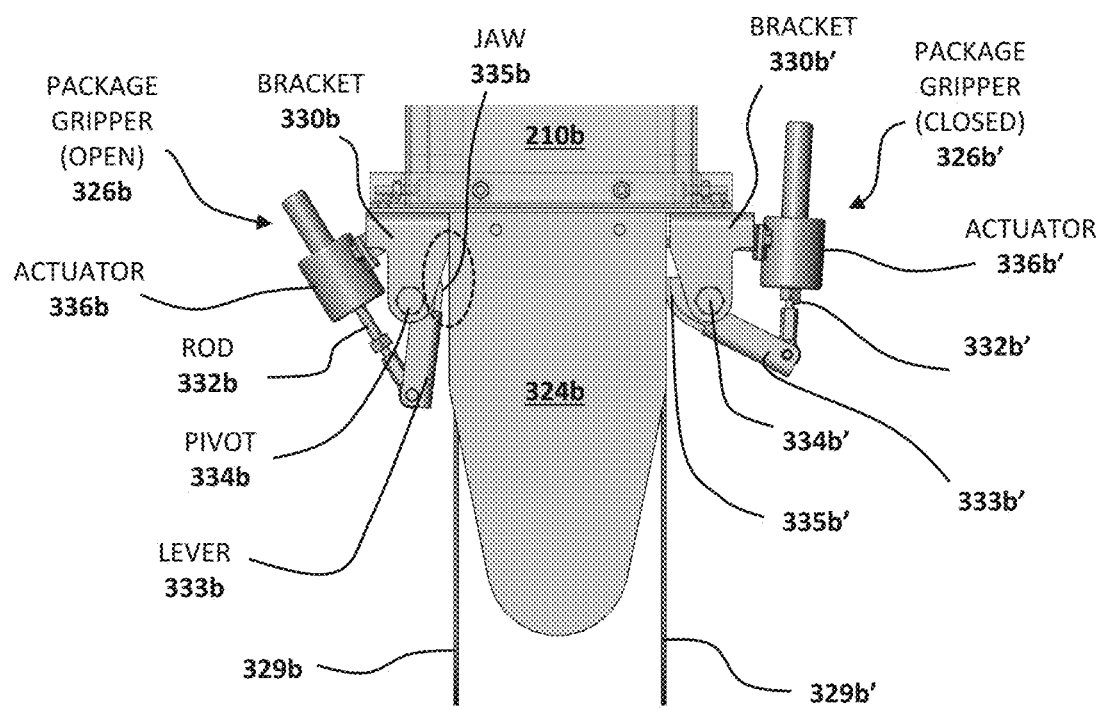
FIG. 9B is a magnified view of rectangle 9B in FIG. 9A, in accordance with an aspect of the present disclosure.

The dashed rectangle labelled 9B in FIG. 9A is magnified in FIG. 9B as noted above. FIG. 9B and the perspective view of FIG. 9C collectively show more detail regarding the functionality of the package grippers 326b, 326b' of the right side of the device 300 (the package grippers 326a, 326a' of the left side of the device are identical and operate in an identical manner). It is seen in FIG. 9B that package grippers 326b, 326b' are engaged to the bottom end of the elevator shaft 210b via respective brackets 330b, 330b' above the respective lateral package guides 329b, 329b'.

Figure 9C:
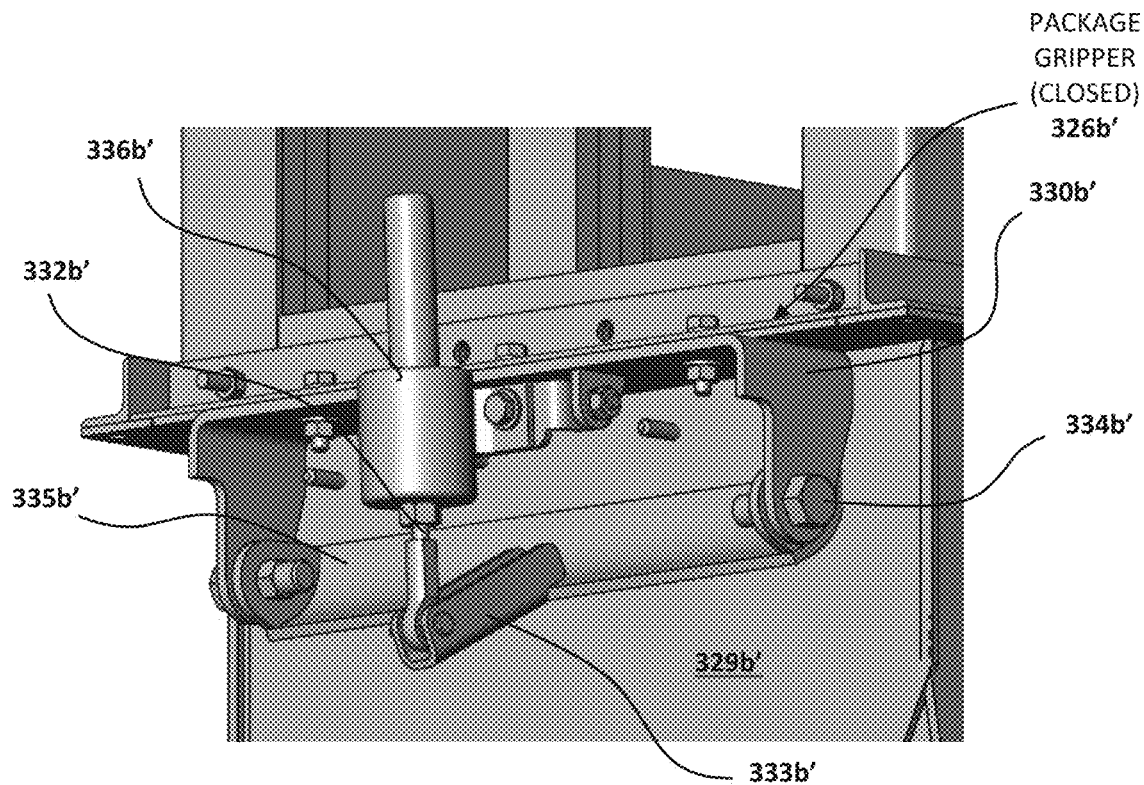
FIG. 9C is a partial perspective view of the package gripper 326b' of the packing device embodiment 300 shown in the closed position, in accordance with an aspect of the present disclosure.
Figure 9D:
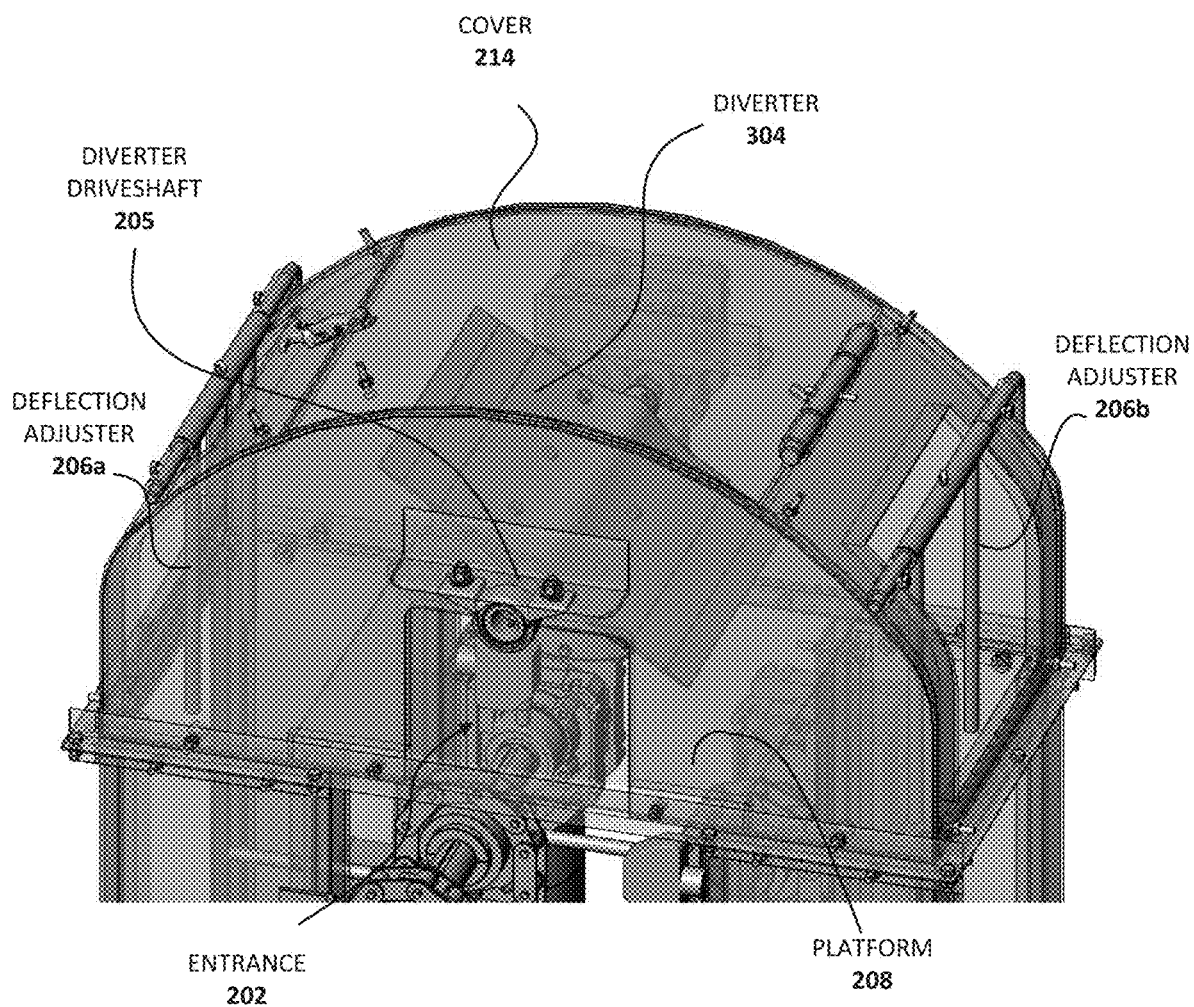
FIG. 9D is a partial perspective view of the top of the packing device embodiment 300, in accordance with an aspect of the present disclosure.

Referring now to FIG. 9C for the sake of simplicity in describing a single package gripper 326b', it is seen that the bracket 330b' supports an actuator 336b' which is connected via a lever 333b' to a curved jaw 335b'. This package gripper 326b' is shown in the closed position where an actuator rod 332b' is retracted, elevating the lever from its normal downward position (see lever 335b in FIG. 9B) and causing the curved jaw 335b' to pivot on a set of opposed axle bolts 334b' and move against the lateral package guide 329b'. This closed arrangement is provided to hold a package (not shown) by clamping it between the jaw 335b' and the package guide 329b'.

Returning now to FIG. 9B, it can be seen that the package gripper 326b (on the left side) of the device 300 is shown in the open position where there is a space (indicated by the dashed ellipse) between the lateral package guide 329b and the curved jaw 335b. This positioning of the jaw 335b with respect to the lateral package guide 329b is attained when the actuator extends the rod 332b to push the lever 333b downwards, causing the curvature of the jaw 335b to move away from the lateral package guide 329b.

In one embodiment, pairs of opposed actuators are programmed to be actuated remotely and simultaneously by an operator using a remote actuator such as a foot controller, which may be in the form of a pedal or similar controlling mechanism located on the ground or floor in close proximity to the corresponding set of package grippers. Therefore, the arrangement shown in FIG. 9B with a left open package gripper 326b and a closed right package gripper 326b' is shown only to illustrate the distinction between the open and closed actuator positions because these package grippers 326b, 326b' should be in the same operational configuration when the device 300 is operating. Stepping on the pedal sends an electrical or wireless signal to open the grippers to allow the operator to position an empty package over a set of the package guides and then stepping off the pedal causes the package grippers to return to their normal position where the package is gripped. When a full package is formed during operation of the device, the operator steps on the pedal again to release the grippers and allow the full package to drop away from the package guides. The operator chooses the best timing for this operation. In one example, the operator releases the full package only after manually grasping the package to prevent it from falling to the floor, thereby allowing it to be immediately carried away from the device 300, to avoid the need for picking up the full package from the ground or floor. This is advantageous in providing efficient transfer of the full package and reducing the likelihood of operator injuries caused by bending over to pick up packages. The actuator may operate using a solenoid-driven mechanism or other similar mechanism to induce movement of the actuator rod in opening and closing the jaw of each gripper. However, as noted above, it is advantageous to arrange the grippers to be normally biased in the gripping (closed) position to permit the package to be gripped and ready to receive the elongated items dropping from the elevator shaft which occurs relatively quickly during operation of the device.

Figure 10:
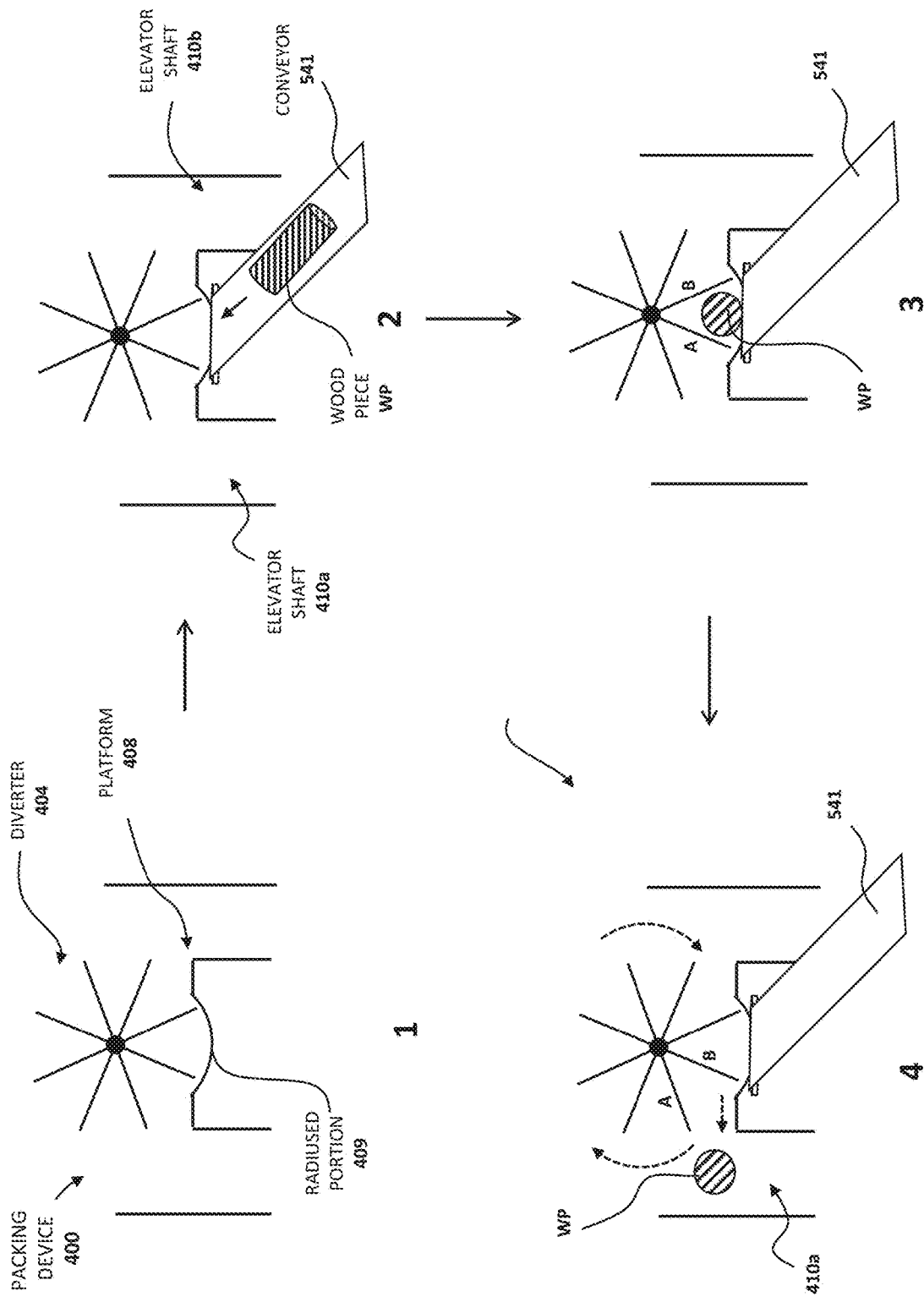
FIG. 10 is a scheme in four panels numbered 1 to 4 showing features in a partial view of another embodiment of a packing device with an 8-paddle diverter 404 functioning with a platform 408 having a radiused portion 409, in accordance with an aspect of the present disclosure.

Turning now to FIG. 10, there is shown a scheme in four panels indicating features relating to a different embodiment of a packing device 400 illustrated in partial views. The packing device 400 has a diverter 404 with functionality which is generally similar, yet improved relative to that of diverter 204 of embodiment 200, for diverting elongated items, such as the example wood piece WP from a platform 408 to elevator shaft 410a or 410b in an alternating fashion as described above. It is seen in panel 1 of FIG. 10 that the diverter 404 of this embodiment has a paddle wheel structure having eight substantially equi-spaced paddles (an alternative embodiment includes sixteen substantially equi-spaced paddles). Platform 408 is provided with a radiused portion 409. The radiused portion 409 induces centralization and alignment of the wood piece WP with respect to the platform 408 and the paddles of the paddlewheel diverter 404. For example, if a wood piece WP arrives on the radiused portion at a higher point along the cross-section of the radiused portion, it will be induced to slide downward towards the lowest point of the radiused portion 409, representing a substantially centralized position. It is to be understood that the central rotational axis of the diverter 404 is substantially centered above the radiused portion 409 such that the paddles of the diverter 404 sweep into and follow the profile of the radiused portion 409. Panel 2 indicates movement of a wood piece WP via a proximal conveyor 541 which is aligned generally with the platform 408. Panel 3 indicates that the proximal conveyor 541 has conveyed the wood piece WP to the platform 408 where it is placed on the radiused portion 409 between paddles A and B. Panel 4 indicates clockwise movement of the diverter 404 to sweep the wood piece WP into the left elevator shaft 401a with a clockwise rotation of the diverter 404 by about 45 degrees.

The closer spacing of the paddles of the diverter 404 represents an improvement over other diverter arrangements such as the 3-paddle arrangement 204 of packing device embodiment 200 because it provides less space on the platform for a wood piece or other elongated item to become mis-aligned on the platform 408. The 8-paddle arrangement of diverter 404 may be sensor-controlled in a manner similar to the sensor control described with respect to FIGS. 8A to 8D. Therefore, if a wood piece WP arrives on the radiused portion 409 of the platform 408 at an angle relative to the longitudinal axis of the proximal conveyor 541, the wood piece WP will be deflected into proper alignment by one or the other of the paddles which are centered to form an inverted "V" above the radiused portion 409, when the diverter 404 is disposed in an open resting position to accept a wood piece WP into the radiused portion 409 of the platform 408. With detection of the positioned wood piece WP by the sensor control, the diverter 404 is actuated to divert the properly aligned wood piece WP out of the radiused portion 409. When diverted into the elevator shaft 410a, the wood piece WP retains proper alignment, thereby facilitating assembly of an aligned stack in the elevator shaft 410a. The inventor has determined that control of the diverter 404 using a servomotor is advantageous because the position encoding function of a servomotor provides precise control for the starting and stopping positions of the diverter 404. Furthermore, the number of paddles of the paddlewheel may be increased to provide reduced spacing between the paddles to configure the paddlewheel for improved diverter functionality if elongated items with reduced dimensions are stacked and packed. For example, the stacking and packaging device may be configured for stacking and packaging of rods or elongated vegetables and it may be preferred in such cases to increase the number of paddles of the paddlewheel diverter to include 16 equi-spaced paddles. It is to be understood that this alternative embodiment will include adjustment to the dimensions of the radiused portion of the platform.

Figure 11:
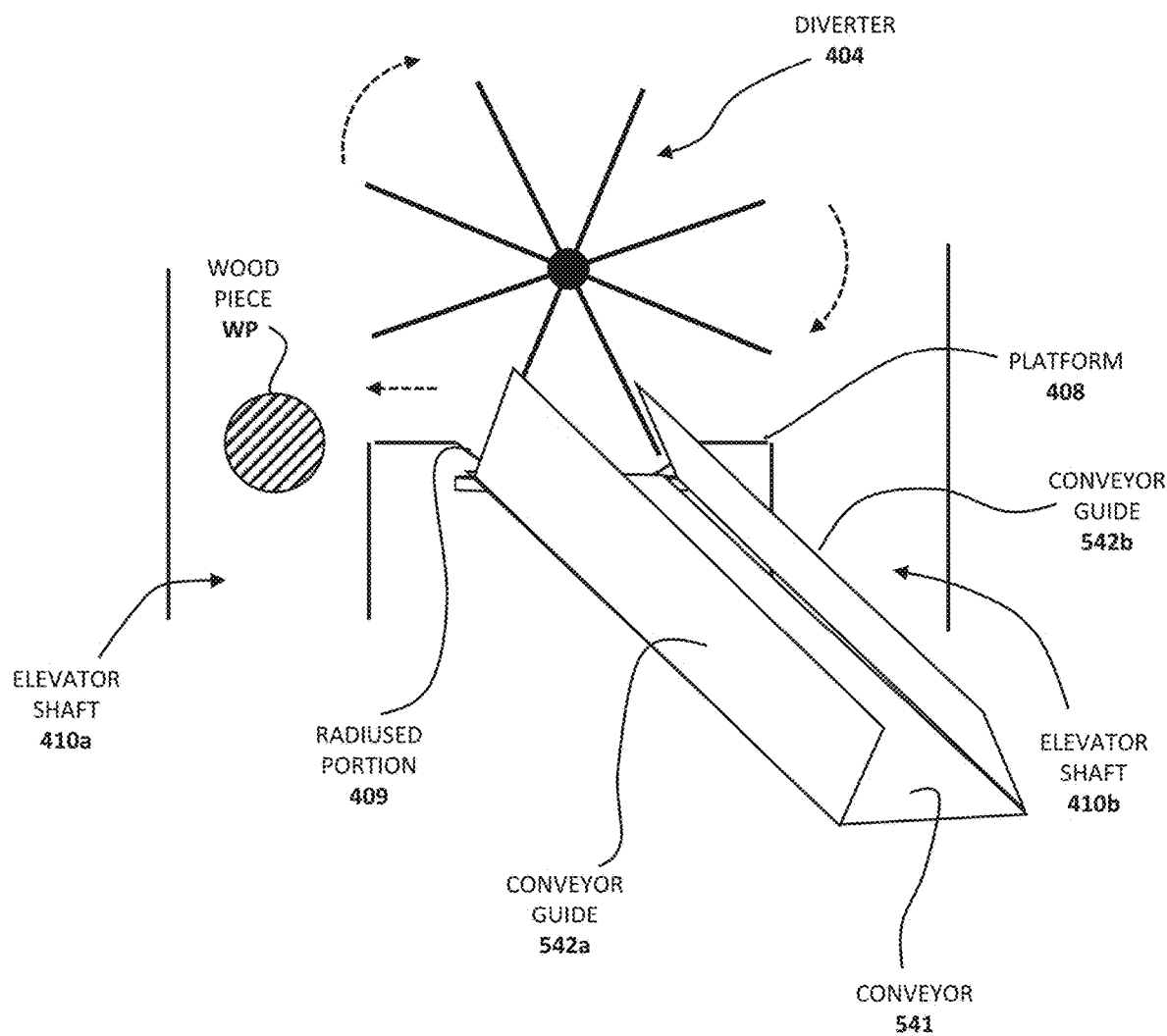
FIG. 11 is a front perspective view corresponding to panel 4 of FIG. 10, showing conveyor guides 542a and 542b, in accordance with an aspect of the present disclosure.

FIG. 11 is a perspective view similar to the arrangement shown in panel 4 of FIG. 10 which illustrates an additional feature of conveyor guide walls 542a,b which are slanted inward over the conveyor 541 and generally aligned with the adjacent paddles centered over the radiused portion in the inverted "V". It has been determined that this arrangement of guide walls 542a,b provides additional alignment of a wood piece as it arrives on the proximal conveyor 541 from the distal conveyor 543 (see FIGS. 12 and 13). For example, when moving from conveyor 543 to 541, if a wood piece WP becomes angled with respect to the longitudinal axis of the conveyor, it will make contact with one of the guide walls 542a,b and through inertial force will be deflected into alignment such that its longitudinal axis is generally aligned with the longitudinal axis of the proximal conveyor 541 to facilitate placement into the radiused portion 409 of the platform 408. These features may be adapted to provide guide walls angled to match the narrower inverted "V" shape of the embodiment which includes the 16-paddleweel diverter for stacking and packaging of rods or elongated vegetables, for example, which have smaller diameters than the average diameter of firewood pieces.

Figure 12:
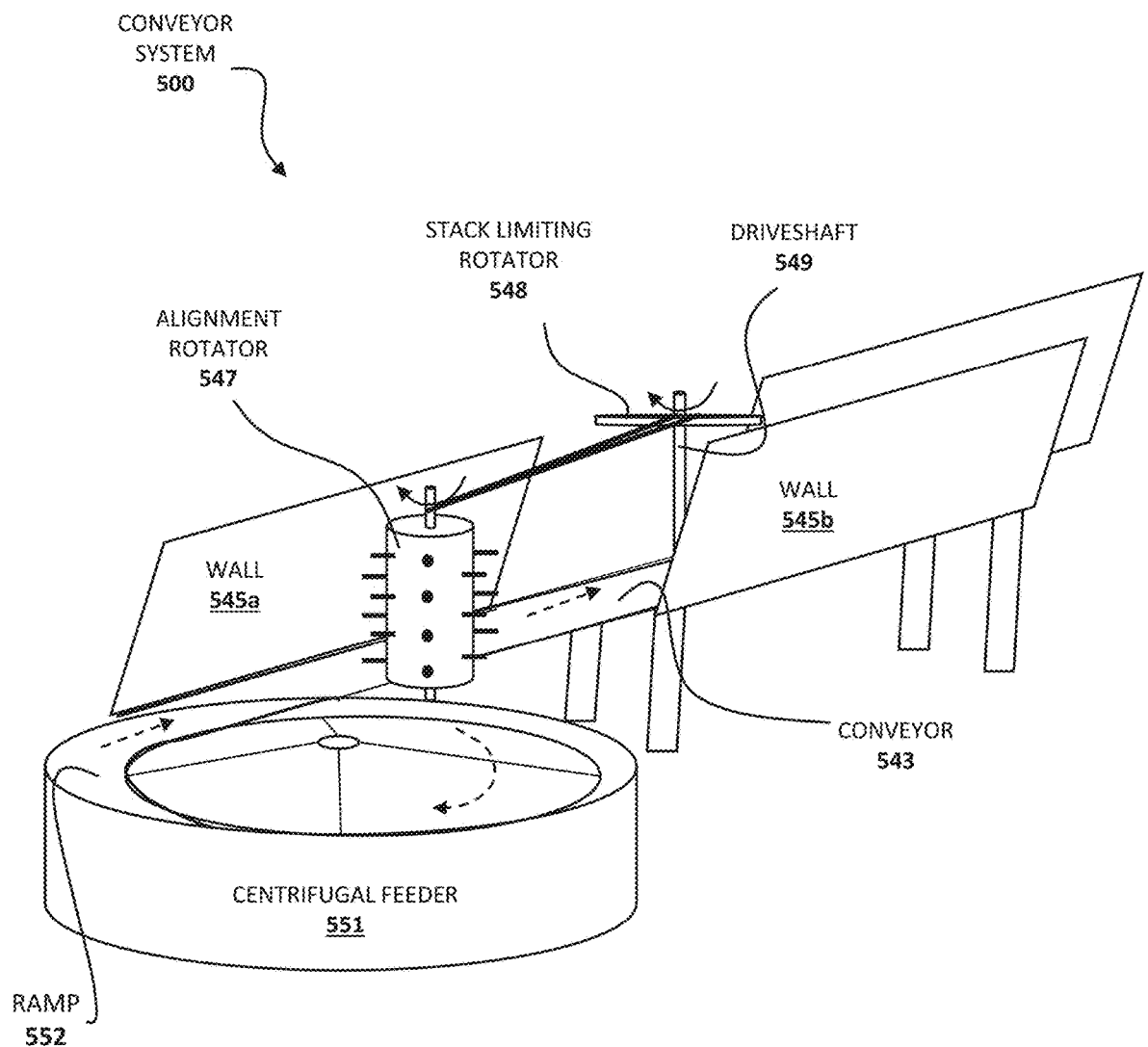
FIG. 12 is a perspective view of a conveyor system 500, in accordance with an aspect of the present disclosure.
Figure 13:
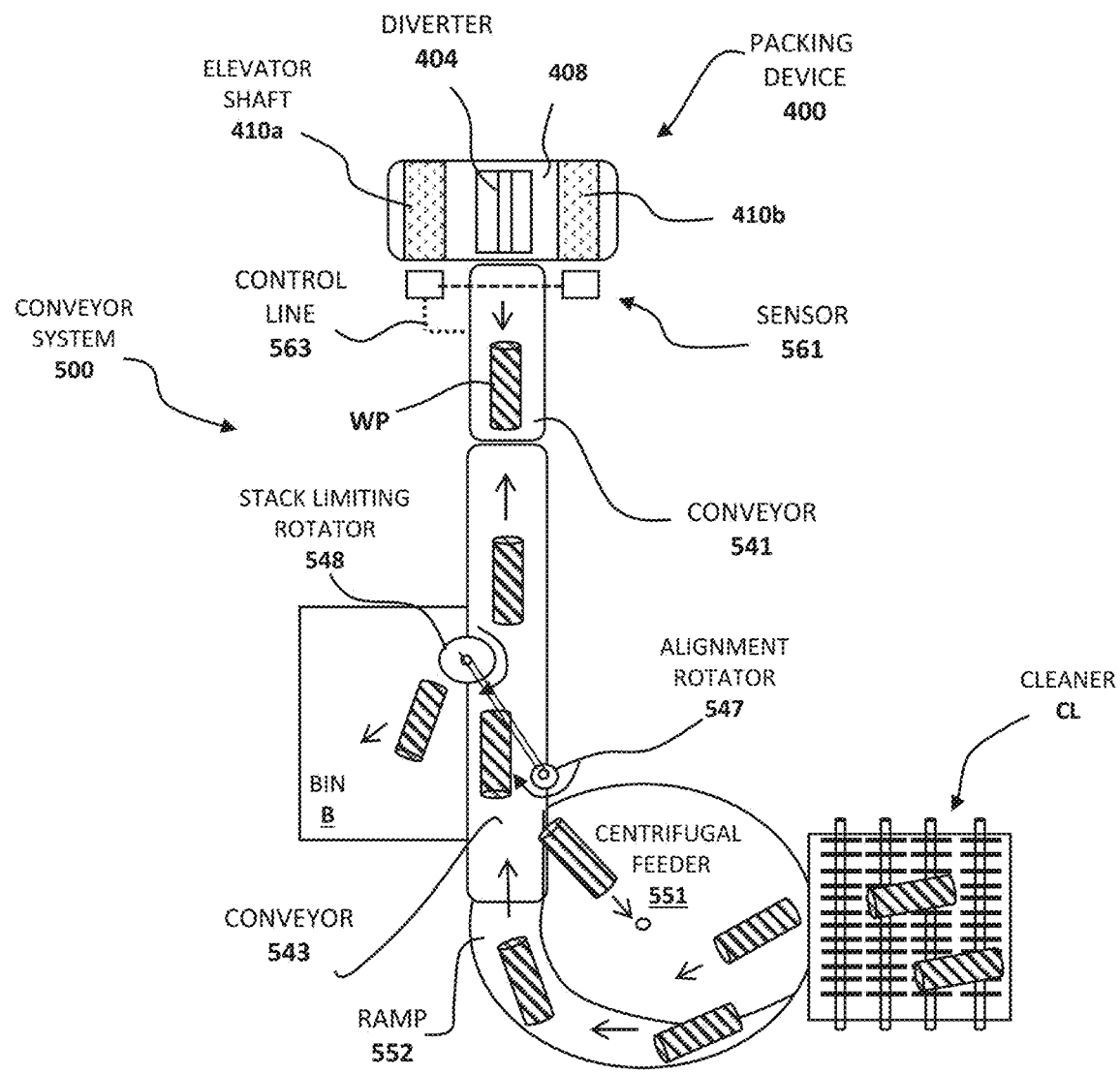
FIG. 13 is a top view of the conveyor system 500 configured for conveying wood pieces WP to a packing device 400, in accordance with an aspect of the present disclosure.

Turning now to FIGS. 12 and 13, there is shown an example embodiment of a conveyor system 500 in perspective and top views, respectively. While this conveyor system 500 is described with respect to processing of wood pieces WP, it is to be understood that the same principles apply for processing of other elongated items using the same system. This conveyor system embodiment 500 includes a conventional centrifugal feeder 551 of the type used for aligning products such as bottles. In such a centrifugal feeder, there is a central rotating cone placed in a bowl and a curved conveyor ramp. When the products are dropped onto the rotating cone, the centrifugal force induces movement of the products towards the circumference of the cone, where they are at least partially induced into alignment with the entrance to the curved conveyor ramp and conveyed for packaging or other processing. In the present example embodiment 500, the centrifugal feeder 551 is a conventional centrifugal feeder such as the type used for aligning bottles for packaging. However, the conveyor system 500 is arranged to have alignment features adapted for alignment of wood pieces WP which have certain irregularities related to natural logs split for firewood. In FIG. 13 it is seen that the wood pieces WP are delivered to the centrifugal feeder 551 directly from a wood cleaner CL which has a series of rotating plates disposed on rollers. The wood cleaner CL removes splinters from the wood pieces WP to provide wood pieces WP which are more easily processed by the conveyor system 500 and the packing device 400. The curved ramp 552 of the centrifugal feeder 551 leads to the entrance of the distal conveyor 543 which has walls 545a,b (seen in FIG. 12).

An alignment rotator 547 is located adjacent to the distal conveyor 543 between the distal conveyor 543 and the centrifugal feeder 551 with a spacing from the entrance to the distal conveyor 543 which is dimensioned to permit a mis-aligned wood piece WP to fall from the distal conveyor 543 back into the centrifugal feeder 551 (see FIG. 13). The alignment rotator 547 is a cylindrical component which may be provided with spikes or other protrusions for improved contact with the wood pieces WP during rotation. The alignment rotator 547 rotates clockwise with respect to the orientations shown in FIGS. 12 and 13 such that misaligned wood pieces WP are induced to move either into general alignment of the longitudinal axis of the distal conveyor 543 or to move off the distal conveyor 543 to fall back into the centrifugal feeder 551. Thus, the alignment rotator is located to provide a gap between the alignment rotator and an adjacent edge of the centrifugal feeder 551 to allow mis-aligned wood pieces WP to fall back into the centrifugal feeder 551.

The conveyor system 500 also includes a stack limiting rotator 548 which in the present embodiment is provided in the form of a wheel arranged to rotate clockwise (in the orientation shown) at a height which causes a one or more wood pieces stacked up on top of a lower wood piece to be forced off the lower wood piece if the stack is tall enough to come into contact with the rotating wheel of the stack limiting rotator 548. If a stack of two wood pieces riding on the distal conveyor 543 is short enough to pass under the stack limiting rotator 548, the stack will remain on the conveyor 541 and will be delivered to the platform 408 of the packing device 400 (shown in FIG. 13) because the stack limiting rotator 548 is dimensioned to permit such stacks to enter the platform 408 without interfering with the diverter 404. Otherwise, if the stack is too tall, an upper wood piece WP will make contact with the stack limiting rotator 548 and the upper wood piece WP will be knocked off the stack to the left of the conveyor 543 and to the right side of wall 545a. A bin B may be provided at that location to collect wood pieces displaced by the stack limiting rotator 548, as shown in FIG. 13. In some embodiments the wheel of the stack limiting rotator 548 may be provided with circumferential teeth to provide partial penetration of the wood pieces WP for more effective displacement. Advantageously in the present embodiment, both the alignment rotator 547 and the stack limiting rotator 548 may be driven by the same driveshaft 549 if a belt is provided between the two rotators 547 and 548, as shown. This driveshaft 549 may be coupled to the same mechanism used to drive one or more of the conveyors 541, 543 and/or the centrifugal feeder 551.

Another feature of the system shown in FIG. 13 is a mechanism to prevent jamming of two wood pieces WP or other elongated items below the diverter 404. This mechanism is provided by a curtain sensor 561 which detects if a wood piece WP is within a threshold distance of the platform 408 while another wood piece is on the platform 408 and positioned in the radiused portion 409 below the diverter 404. The curtain sensor 561 is in communication with the driver of the proximal conveyor 541 via control line 563. If the curtain sensor 561 is triggered by the presence of a wood piece WP within the threshold distance, the conveyor 541 will stop and reverse for a predetermined time period of in the range of about 0.5 to about 1.5 seconds, in order to provide an appropriate distance separation of wood pieces WP at the platform 408. Once the diverter 404 is triggered to move the wood piece WP from the platform 408 into one of the elevator shafts 410a,b, the proximal conveyor 541 will be reactivated to its normal continuous conveyance operation.

Figure 14:
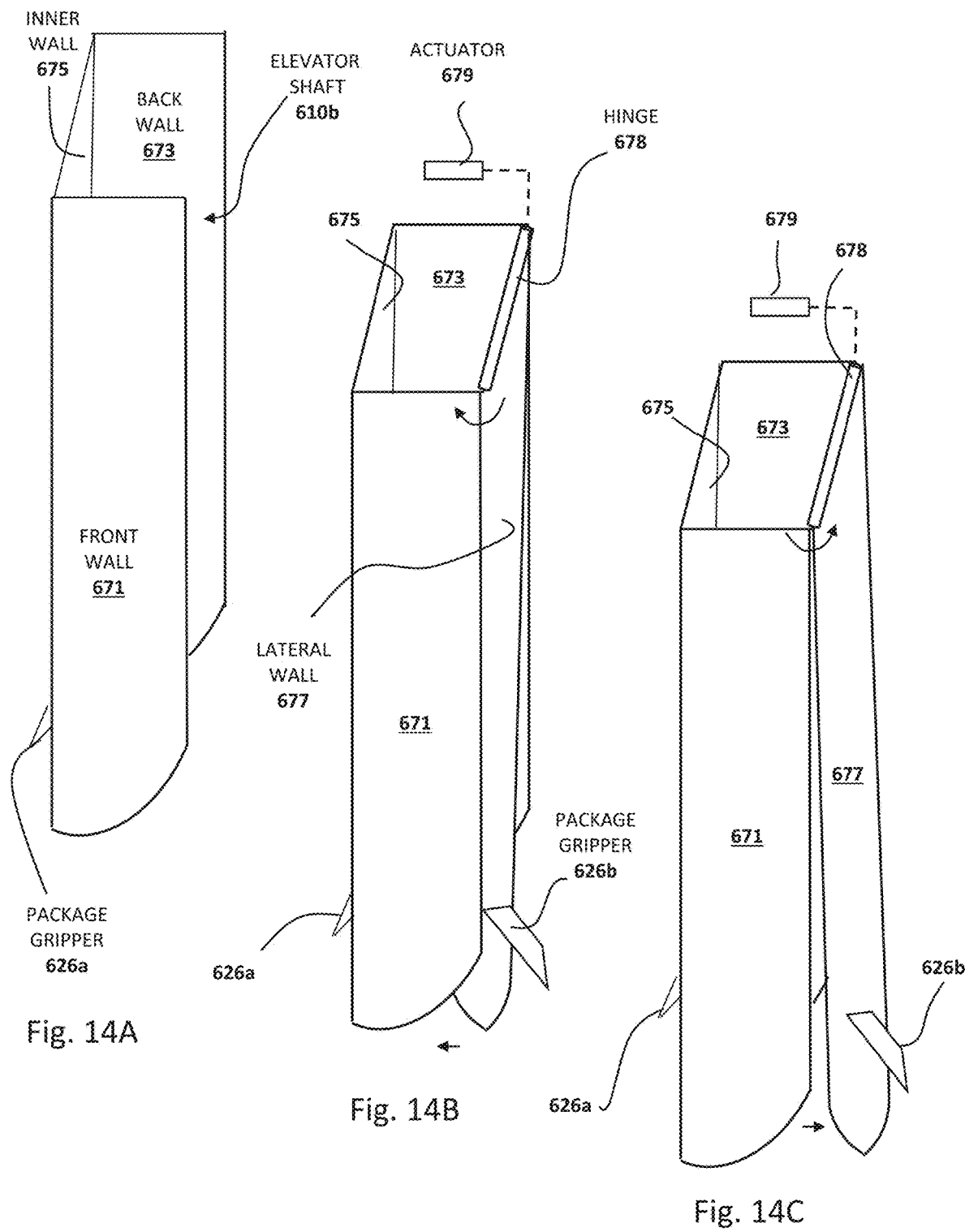
FIG. 14A is a perspective front view of a partial assembly of an elevator shaft 610b prior to installation of a movable lateral wall 677, in accordance with an aspect of the present disclosure.
FIG. 14B is a perspective front view of a complete assembly of elevator shaft 610b after installation of a lateral wall 677, which is shown in the closed position in accordance with an aspect of the present disclosure.
FIG. 14C is a perspective front view of a complete assembly of elevator shaft 610b after installation of a lateral wall 677, which is shown in an open position, in accordance with an aspect of the present disclosure.

Turning now to FIGS. 14A to 14C, there is shown another embodiment of a right-side elevator shaft 610b which may be incorporated into any embodiment of the packing device, such as embodiments 200 and 400, for example (the same arrangement would be provided in the opposing left side elevator shaft, which would be designated elevator shaft 610a (not shown). This embodiment of the elevator shaft 610b was developed to address problems in fitting an empty package (such as a plastic bag or box for holding wood pieces, for example) to the bottom of an elevator shaft of any embodiment of the packing device. In addition, this embodiment of the elevator shaft 610a also has curved lower edges to dispense with sharp corners which has been determined during testing to cause jamming of wood pieces during operation. FIG. 14A shows a perspective view of a partial assembly of elevator shaft 610a, with a front wall 671, a back wall 673 and an inner wall 675. The elevator shaft 610a also has a lateral wall 677 which is omitted in FIG. 14A but is seen in FIGS. 14B and 14C. FIGS. 14B and 14C show that the lateral wall 677 is pivotable on a hinge 678 inwards into the space of the elevator shaft 610a in FIG. 14B and outward, outside the right edges of the front wall 671 and back wall 673 in FIG. 14C. This moveable lateral wall arrangement reduces the incidence of jamming of wood pieces in the elevator shaft 610a. In addition, the hinge 678 may be driven by an actuator 679 controlled remotely by an operator. In one example embodiment, the actuator 679 is controlled wirelessly via a foot pedal controlled by the operator (not shown). If the lateral wall 677 is disposed outward and an operator has difficulty fitting an empty package to the bottom of the elevator shaft 610a, the operator can control the actuator 679 to move the lateral wall 677 inwards. Once the empty package is installed on the bottom of the elevator shaft 610a, the operator can actuate the package grippers 626a,b to retain the package in place. If a stack of wood is improperly formed and jammed in the elevator shaft 610a, the operator also has the option of actuating movement of the lateral wall 677 to open up more volume in the elevator shaft 610a in an attempt to dislodge the jammed stack.

Figure 15:
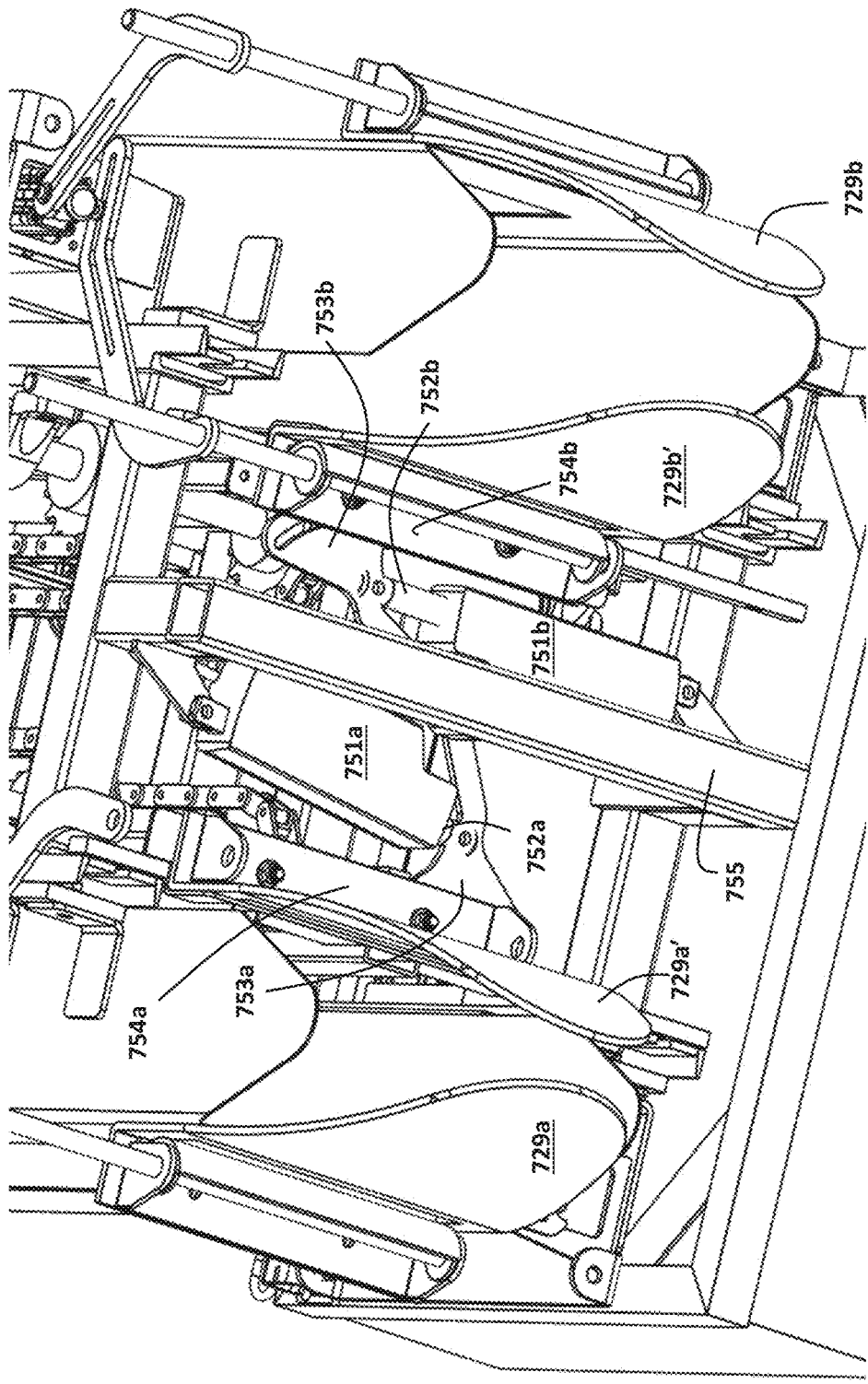
FIG. 15 is a perspective bottom view of another embodiment of the device showing an arrangement of actuators 751a and 751b for driving movement of pivotable inner walls, in accordance with an aspect of the present disclosure.

In FIG. 15, there is shown a bottom perspective view of another embodiment of a stacking and packaging device with a pivoting wall in each elevator shaft. In this embodiment, the pivoting wall is the inner wall. Pivoting the inner wall of each elevator shaft is advantageous relative to pivoting of the outer wall of each elevator shaft because the movement is contained within the interior of the stacking and packaging device and therefore less likely to encounter external interference or obstructions during operation. Pivoting of the two inner walls is induced by actuators 751a and 751b which are mounted between the inner walls and a central frame member 755 via brackets 754a and 754b and linkers 753a and 753b. The walls of the elevator shafts are generally obscured in this view. However, on the right side elevator shaft of FIG. 15 it is seen that the front and back package guides 729b and 729b' (which are aligned with the inner and lateral walls) are farther apart than the front and back package guides 729a and 729a' because the inner wall of the right side elevator shaft is pivoted inwards as indicated by the arrow, creating a wider open dimension of the elevator shaft. Extension of rod 752b causes the linker 753b to pull the inner wall further inward. In contrast, rod 752a of the left side elevator shaft is retracted and the left side inner wall is not pivoted inwards. As a result, the ends of package guides 729a and 729a' are closer together, creating a narrower dimension for the elevator shaft. As noted above for the previously described embodiment, the actuators 751a and 751b may be remotely actuated by an operator for the same reasons described above. In one preferred embodiment, the actuation of the actuators 751a and 751b is configured to generate the wider form of the elevator shaft (inner wall pivoted inward) simultaneously with opening of the package grippers to release the package. This provides the effect of stretching the opening of the package (which may be a bag or a box) as the stack of elongated items is dropped into the package. This further reduces the likelihood that elongated items of the stack will come into contact with the sides of the bag or box and cause an obstruction which would prevent the package of elongated items from being formed properly.

As noted hereinabove, the embodiments previously discussed represent selected examples of implementation of the principles of the invention. A number of alternative embodiments are possible, which are also within the scope of the invention as defined by the claims.

In one alternative embodiment, the device has more than two elevator shafts. In this alternative embodiment, conveyance of wood pieces and timing of arrival of individual wood pieces at the diverter is strictly controlled at a main conveyor feeding wood pieces to the device and the device has a circular entrance platform and with a shaped diverter mounted centrally thereto. The axis of rotation of the diverter is perpendicular to the plane of the circular platform. The circular platform is surrounded by a sidewall having more than two vertical openings, each leading to its own elevator shaft. In this embodiment, wood pieces arriving at the diverter are pushed into one of the openings by cooperation between the shape of the diverter and the shape of the sidewall, while the other openings remain covered by sliding doors or other covering mechanisms which may be automatically controlled by sensors determining positioning of support members and/or wood stacks associated with various elevator shafts. In such embodiments, it may be advantageous to provide a sloped transition between each one of the openings and the elevator shaft. Thus, the elevator shafts can be extended radially away from the circular platform.

In another alternative embodiment, the device has only a single elevator shaft to satisfy situations where high throughput is not required. In such embodiments, the device includes a simpler controller because alternating between creating stacks in one or more additional elevator shafts is not required. Otherwise, the construction of this alternative device may be similar to the main example embodiment described hereinabove with the exception that it only includes a single elevator shaft, and a single chain drive.

While the example embodiments described hereinabove have two chains associated with each chain drive, alternative embodiments may be constructed having only a single chain or more than two chains associated with each chain drive.

The pairs of support members of the device 200 described above may be provided in alternative forms having cross bars or additional supporting structures to enhance the support function and may be connected to respective chain drives using alternative connection means.

While embodiments of the device were prepared with to address the problem of efficiently packaging firewood, it is to be understood that the processing principles are amenable to packaging other elongated items as described above, whether they have irregular structure or not. Examples of such other elongated items may include, but are not limited to, lumber pieces, cylinders, pipes and agricultural products including vegetables such as corn cobs. Other alternative embodiments of the device are configured to process package smaller items, such as, for example, smaller wood pieces having lengths of about 2 inches (about 5.1 cm) to about 12 inches (about 30 cm). In one non-limiting example, small wood pieces having similar lengths and widths of each ranging from about 2 to about 3 inches (about 5.1 cm to about 7.6 cm) which are used for example in wood-fired pizza ovens, are processed using the device of the main embodiment described above, wherein the pairs of support members associated with the chain drives each hold a basket for collecting the small wood pieces. When the basket reaches a point near the bottom of the elevator shaft it dumps its contents into an attached package.

Other than described herein, or unless otherwise expressly specified, all of the numerical ranges, amounts, values and percentages, such as those for amounts of materials, elemental contents, times and temperatures, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Any patent, publication, internet site, or other disclosure material, in whole or in part, which is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs.

While this invention has been particularly shown and described with references to example embodiments thereof, it will be understood by those skilled in the art that various changes in form and details may be made therein without departing from the scope of the invention encompassed by the appended claims.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context.

It is also noted that the term "comprising" is intended to be open and permits but does not require the inclusion of additional elements or steps. When the term "comprising" is used herein, the term "consisting of" is thus also encompassed and disclosed. Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. Where the term "about" is used, it is understood to reflect+/−10% of the recited value. In addition, it is to be understood that any particular embodiment of the present invention that falls within the prior art may be explicitly excluded from any one or more of the claims. Since such embodiments are deemed to be known to one of ordinary skill in the art, they may be excluded even if the exclusion is not set forth explicitly herein.

What is claimed is:

1. A device for packaging elongated items, the device comprising:
    an elevated structure having an upper platform for receiving the elongated items from a separate conveyor;
    a paddlewheel diverter located above the platform, for changing the direction of movement of the elongated items; and
    one or more elevator shafts having open bottoms, the elevator shafts located adjacent to the platform and configured for receiving the elongated items after contact with the diverter and configured for holding the elongated items therein while a stack of elongated items is formed, the elevator shafts provided with one or more support structures configured to hold the stack of elongated items as it is formed and to release the stack of elongated items from the device after it is completely formed, with the release of the stack of elongated items from the elevator shafts occurring via the open bottoms of the elevator shafts,
    wherein the elevator shafts have stationary front, back and lateral walls and an inner wall which is pivotable inward with respect to the stationary front, back and lateral walls,
    wherein the inner wall pivots on a hinge located between a top corner of the front wall and a top corner of the back wall.

2. The device of claim 1, wherein the one or more elevator shafts are two opposed elevator shafts arranged laterally outward from outer edges of the platform.

3. The device of claim 1, wherein the platform includes a central radiused portion extending below the main horizontal plane of the platform, the radiused portion for centralizing an elongated item on the platform between adjacent paddles of the paddlewheel diverter.

4. The device of claim 1, wherein the paddlewheel diverter is configured for both clockwise and counterclockwise rotation by rotation of the diverter driveshaft.

5. The device of claim 1, wherein the paddlewheel diverter has eight paddles or sixteen paddles.

6. The device of claim 5, wherein the paddlewheel diverter is substantially centered above the radiused portion and the paddles extend below a horizontal plane of the platform and follow a profile of the radiused portion during rotation of the diverter.

7. The device of claim 1, wherein rotation of the diverter is controlled by a servomotor.

8. The device of claim 1, wherein pivoting of the inner wall is driven by an actuator mounted between a lower end of the inner wall and an inner support frame member for adjusting the volume of the elevator shaft to place packaging on the lower end of the elevator shaft or to dislodge a jammed stack of the elongated items.

9. A conveyor system configured for use with the device of claim 1, the system comprising:
    a first conveyor arranged to deliver the elongated items to the platform of the device; and
    a pair of opposed guide walls adjacent to the first conveyor, the guide walls angled towards each other and aligned with adjacent paddles of the paddlewheel diverter in an open resting position of the diverter where the adjacent paddles form an inverted "V" shape above the platform.

10. The conveyor system of claim 9, further comprising a second conveyor arranged to convey the elongated items to the first conveyor.

11. The conveyor system of claim 10, further comprising a centrifugal feeder configured to convey the elongated items to the second conveyor.

12. The conveyor system of claim 11, further comprising an alignment rotor arranged between the second conveyor and the centrifugal feeder, the alignment rotor configured for rotation to induce alignment of the elongated items with a longitudinal axis of the second conveyor.

13. The conveyor system of claim 10, further comprising a stack limiting rotator adjacent to the second conveyor, the stack limiting rotator configured to displace a stacked elongated item out of the conveyor system.

14. The conveyor system of claim 13, wherein the alignment rotor and the stack limiting rotator are configured for rotation driven by a single driveshaft via a belt connecting the alignment rotor and the stack limiting rotator.

15. The conveyor system of claim 9, further comprising a sensor configured to detect when a first elongated item is positioned on the platform and a second elongated item is on the first conveyor within a threshold distance from the platform, the sensor in communication with a driver of the first conveyor to stop and reverse the conveyor for a predetermined period of time to further separate the second elongated item from the first elongated item.

16. The use of the device of claim 1, for packaging elongated items, wherein the elongated items are firewood, lumber pieces, pipes, cylinders, rods or vegetables.

17. The use of claim 16, wherein the elongated items range in length from between about 2 inches to about 18 inches.

18. The use of the system of claim 9, for packaging elongated items, wherein the elongated items are firewood, lumber pieces, pipes, cylinders, rods or vegetables.

19. The use of claim 18, wherein the elongated items range in length from between about 2 inches to about 18 inches.

20. A device for packaging elongated items, the device comprising:
  an elevated structure having an upper platform for receiving the elongated items from a separate conveyor;
  a paddlewheel diverter located above the platform, for changing the direction of movement of the elongated items; and
  one or more elevator shafts having open bottoms, the elevator shafts located adjacent to the platform and configured for receiving the elongated items after contact with the diverter and configured for holding the elongated items therein while a stack of elongated items is formed, the elevator shafts provided with one or more support structures configured to hold the stack of elongated items as it is formed and to release the stack of elongated items from the device after it is completely formed, with the release of the stack of elongated items from the elevator shafts occurring via the open bottoms of the elevator shafts,
  wherein the elevator shafts have stationary front, back and lateral walls and an inner wall which is pivotable inward with respect to the stationary front, back and lateral walls,
  wherein pivoting of the inner wall is driven by an actuator mounted between a lower end of the inner wall and an inner support frame member for adjusting the volume of the elevator shaft to place packaging on the lower end of the elevator shaft or to dislodge a jammed stack of the elongated items.

21. The device of claim 20, wherein the actuator is remotely controllable by an operator.

22. A conveyor system configured for use with the device of claim 20, the system comprising:
  a first conveyor arranged to deliver the elongated items to the platform of the device; and
  a pair of opposed guide walls adjacent to the first conveyor, the guide walls angled towards each other and aligned with adjacent paddles of the paddlewheel diverter in an open resting position of the diverter where the adjacent paddles form an inverted "V" shape above the platform.

* * * * *